United States Patent [19]

Suzuki

[11] Patent Number: 4,852,976
[45] Date of Patent: Aug. 1, 1989

[54] LIQUID CRYSTAL DISPLAY DEVICE
[75] Inventor: Yasushi Suzuki, Tanashi, Japan
[73] Assignee: Citizen Watch Co., Ltd., Tokyo, Japan
[21] Appl. No.: 298,207
[22] Filed: Jan. 17, 1989

Related U.S. Application Data

[63] Continuation of Ser. No. 829,384, Feb. 13, 1986, abandoned.

[30] Foreign Application Priority Data

Feb. 15, 1985 [JP] Japan .................. 60-027588
Feb. 19, 1985 [JP] Japan .................. 60-030998
Feb. 19, 1985 [JP] Japan .................. 60-030999
Mar. 26, 1985 [JP] Japan .................. 60-061169

[51] Int. Cl.$^4$ .................. G02F 1/13; G02B 5/30
[52] U.S. Cl. .................. 350/339 R; 350/337; 350/347 R; 350/389
[58] Field of Search .................. 350/338, 337, 347 R, 350/347 E, 408, 389, 339 R

[56] References Cited

U.S. PATENT DOCUMENTS 3,923,379 12/1975 Kumada .................. 350/389
4,080,046 3/1978 Nishizaki .................. 350/347 R
4,492,433 1/1985 Imaya et al. .................. 350/347 R
4,653,861 3/1987 Kando et al. .................. 350/337
4,770,500 9/1988 Kalmanash et al. .................. 350/347 E

FOREIGN PATENT DOCUMENTS 1396828 4/1975 United Kingdom .................. 350/347 E
1470523 4/1977 United Kingdom .................. 350/347 R

OTHER PUBLICATIONS

T. J. Scheffer, "New Multicolor Liquid Crystal Displays that use a Twisted Nematic Electro-Optical Cell" Appl. Phys., vol. 44, No. 11, No. 1973.

Primary Examiner—Stanley D. Miller
Assistant Examiner—Huy Kim Mai
Attorney, Agent, or Firm—Jordan and Hamburg

[57] ABSTRACT

A display device including a liquid crystal cell which comprises first and second transparent substrates spaced apart substantially in parallel from each other to form a gap therebetween, a body of twisted-nematic liquid crystal filing the gap between the substrates, orientation means urging the liquid crystal molecules in the gap to orient in a first direction in the vicinity of the inner face of the first substrate and in a second direction in the vicinity of the inner face of the second substrate, the first direction being substantially perpendicular to the second direction, a pair of polarizer films one overlying the first substrate and the other underlying the second substrate, and at least one phase-shift film intervening between one of the first and second substrates and one of the polarizer films.

14 Claims, 21 Drawing Sheets

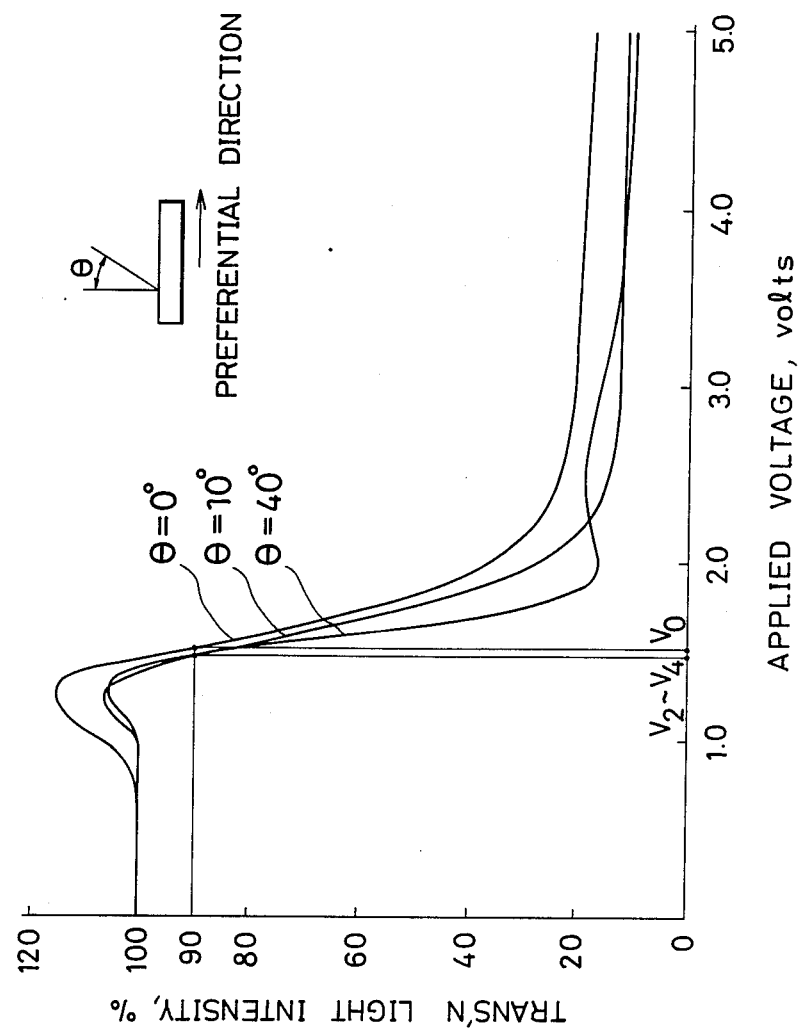

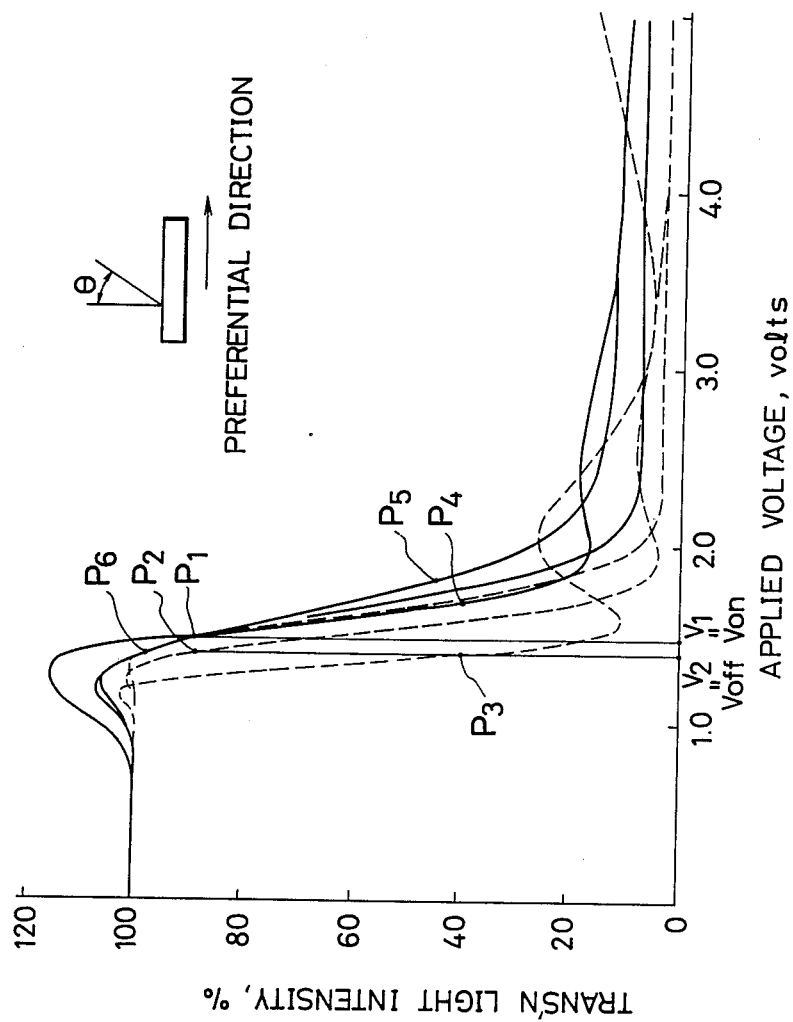

LIQUID CRYSTAL DISPLAY DEVICE

This application is a continuation of application Ser. No. 829,384 filed Feb. 13, 1986, now abandoned.

FIELD OF THE INVENTION

The present invention relates to display devices and, more particularly, to display devices providing improved view-angle characteristics.

BACKGROUND OF THE INVENTION

Research and development efforts are being made to utilize display devices as the display means for various electronic office systems. Using display devices for such purposes requires development of larger liquid crystal cells of the multidivisional designs. The most typical of the various types of display devices presently in use are those which utilize twisted-nematic liquid crystals. As well known in the art, however, display devices of this type are rather inferior in contrast and view-angle characteristics to display devices using cathode-ray tubes. The view-angle characteristics of display devices using liquid crystals tend to still deteriorate when the liquid crystal cells are larger sized for use in electronic office systems because of the fact that the display screens using such large-sized cells require wider angles of view. The deterioration in the view-angle characteristics apparently results in degraded qualities of the display. Division of a liquid crystal cell into increased numbers of segments as in display devices for use in electronic office systems causes significant reduction in the duty ratios operable for driving the electrodes and this, in turn, results in further deterioration of the qualities of the pictures to be produced on the screen.

Display devices using twisted-nematic liquid crystal cells thus present problems which result from the two kinds of performance characteristics, viz., the view angle and contrast characteristics of the liquid crystal cells. As well known in the art, these performance characteristics of liquid crystal cells depend largely on the properties and accordingly the types of the liquid crystals used. Thus, a liquid crystal having a relatively small birefringence index will suit the purpose of achieving improved view-angle characteristics while a liquid crystal having a relatively large birefringence index will be preferred for achieving improved contrast characteristics. There are presently known no such liquid crystals that meet both of these two mutually conflicting requirements. A compromise has therefore been accepted in display devices presently available on a commercial basis. According to this compromise, a liquid crystal having a relatively large birefringence index is used to place a priority on the contrast characteristics of the display device rather than on the view-angle characteristics which are prescribed to provide the optimum contrast solely in particular directions which are likely to be most frequently used.

Typical of the liquid crystals presently used for providing high contrast characteristics are those which have birefringence indices ranging from 0.13 to 0.15, view angles ranging from 10 degrees to 35 degrees and a contrast ratio of 8:1. Examples of the liquid crystals used for providing high view-angle characteristics include those which have birefringence indices ranging from 0.08 to 0.10, view angles ranging from 10 degrees to 40 degrees and a contrast ratio of 6:1. For display devices of the multidivisional types, the liquid crystals providing high contrast characteristics are used exclusively.

Display devices for use in electronic office systems in general are broken down to those forming vertically elongated screens and those forming horizontally elongated screens. Where display devices are used to provide vertically elongated screens, the viewers are required to be positioned in front of the display screens to view the total areas of the screens and, thus, the rather inferior view-angle characteristics inherent in display devices become the important problem. As well known in the art, the view angles to provide the optimum range of contrast by multidivisional display devices using liquid crystals providing high contrast characteristics range from 10 degrees to 35 degrees from the directions normal to the display screens to preferential directions of viewing. display means for an electronic office system, it is thus important to improve the view-angle characteristics of the display device as a whole to cope with the enlarged visual angles with respect to the display screens. Where a vertically elongated display screen is used for the device, it is required that the range of the view angles to provide the optimum range of contrast be shifted to a range containing zero degrees to the directions normal to the display screen or, in other words, the directions of viewing to provide the optimum contrast be made identical with the directions normal to the display screen.

There are presently two major approaches to realizing the arrangement in which the directions of viewing with the optimum contrast are to be made identical with the directions normal to the display screen.

One approach is to have recourse to using higher voltages to be applied between the common and segment electrodes of the display device for thereby achieving the optimum contrast when the display screen is viewed particularly in the directions normal to the screen. Adoption of this expedient however results in darkening of the images throughout the display area and further presents a problem that the range of the view angles to provide the optimum range of contrast tends to be narrower than the ordinarily used range of 10 degrees to 35 degrees. The use of higher voltages will also result in problems such as the increase in the power consumption and the accelerated deterioration of the liquid crystal cell.

The other approach is to place a Fresnel lens as a prism on top of the display structure while maintaining the view-angle characteristics of the device unchanged. With the prism thus positioned on the display structure, the display patterns with the optimum contrast achievable by the range of the view angles of the display screen are oriented into directions normal to the display screen. This approach might however cause deformation of the images on the screen and critical reduction of the contrast due to the scattering of the display light through the prism and to admission of noise light into the display screen, if the Fresnel lens used fails to be correctly positioned with respect to the matrix pattern of the electrodes. Extreme difficulties are experienced in achieving proper registration between the Fresnel lens and the electrode pattern and, for this reason, the second approach to providing directions of viewing with the optimum contrast in the directions normal to the display screen is a far cry to practical use.

The present invention contemplates elimination of these and other problems encountered in prior-art display devices using multidivisional, large-sized liquid crystal cells.

It is, accordingly, an important object of the present invention to provide a display device using an improved multidivisional, large-sized liquid crystal cell providing satisfactory view angle and contrast characteristics.

It is another important object of the present invention to provide a display device using an improved multidivisional, large-sized liquid crystal cell having excellent view-angle characteristics and adapted to achieve optimum contrast in the directions normal to the display screen.

SUMMARY OF THE INVENTION

In accordance with the present invention, there is provided a display device including a liquid crystal cell which comprises (a) first and second transparent substrates spaced apart substantially in parallel from each other to form a gap therebetween, (b) a body of twisted-nematic liquid crystal filing the gap between the substrates, (c) orientation means urging the liquid crystal molecules in the gap to orient in a first direction in the vicinity of the inner face of the first substrate and in a second direction in the vicinity of the inner face of the second substrate, the first direction being substantially perpendicular to the second direction, (d) a pair of polarizer films one overlying the first substrate and the other underlying the second substrate, and (e) at least one phase-shift film having two vibrational directions consisting of a direction of axis X' which travels with the larger one of two different refractive indices and a direction of Z' which travels with the smaller one of the two different refractive indices, said phase-shift film intervening between one of the first and second substrates and one of the polarizer films.

BRIEF DESCRIPTION OF THE DRAWINGS

The features and advantages of a display device according to the present invention will be more clearly appreciated from the following description taken in conjunction with the accompanying drawings in which:

FIG. 8 is a graph showing I–V curves for the first preferred embodiment of the present invention with the view angles selected at predetermined degrees;

FIG. 9 is a graph showing I–V curves similar to those shown in FIG. 4 and I–V curves similar to those shown in FIG. 8 for comparison between the view-angle characteristics of the prior art liquid crystal cell and those of the first preferred embodiment of the present invention;

FURTHER DESCRIPTION OF THE PRIOR ART

Figure 1:
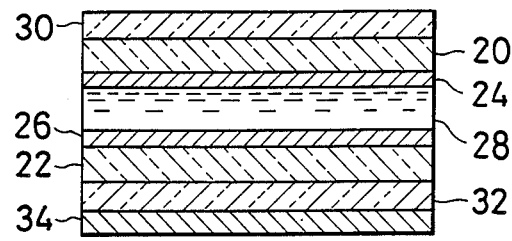
FIG. 1 is a cross sectional view showing the construction of a liquid crystal cell used in a prior-art display device.
Figure 2:
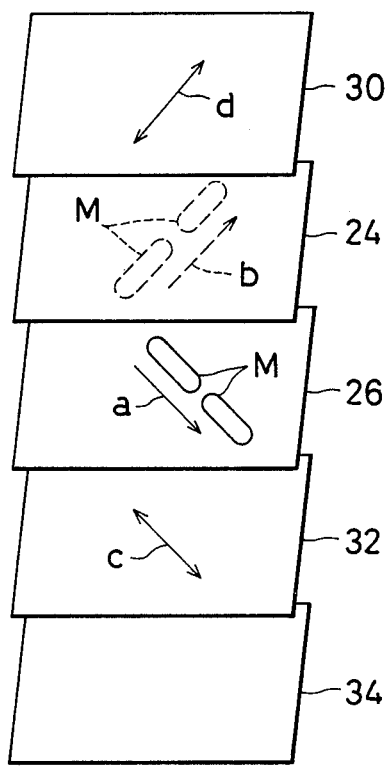
FIG. 2 is a schematic disassembled view of the liquid crystal cell shown in FIG. 1.

Referring to FIGS. 1 and 2 of the drawings, the liquid crystal cell forming part of a prior-art display device comprises a pair of substrates 20 and 22 of transparent glass which are spaced apart in parallel from each other. The grass substrates 20 and 22 have orientation films 24 and 26 of, for example, polyimide attached to their respective inner faces and have a layer of twisted-nematic liquid crystal 28 filling the gap between these orientation films 24 and 26. Though not seen in the drawings, each of the orientation films 24 and 26 has a myriad of parallel micro-grooves formed by a rubbing process which is well known in the art. The micro-grooves in the orientation film 24 on the upper glass substrate 20 are directed at right angles to the micro-grooves in the orientation film 26 on the lower glass substrate 22. In the vicinity of the orientation films 24 and 26, the twisted-nematic liquid crystal molecules present between these films 24 and 26 as schematically indicated at M in FIG. 2 are thus forced to orient in parallel with the micro-grooves in the films 24 and 26 within the limits of error of plus and minus 2 to 5 degrees to the directions of the micro-grooves. Furthermore, the major axes of the liquid crystal molecules M in the vicinity of one of the orientation films 24 and 26 are perpendicular within the limits of error of plus and minus 10 degrees to the major axes of the liquid crystal molecules M in the vicinity of the other orientation film.

The liquid crystal cell shown in FIGS. 1 and 2 further comprises a pair of linear polarizer films 30 and 32 attached to the outer faces of the upper and lower glass substrates 20 and 22, respectively. The display device using the liquid crystal cell herein shown is assumed to be of the reflection type and thus the liquid crystal cell further has a reflector plate 34 attached to the outer face of the lower polarizer film 32 as shown.

Analyses have been made into the various properties and characteristics of the prior-art liquid crystal cell constructed basically as hereinbefore described. The glass substrates 20 and 22 of each of the sample cells prepared and used for these analyses measured 1 mm by 1 mm in area and were spaced apart 9 microns from each other. The orientation films 24 and 26 on these substrates 20 and 22 were formed by coating one surface of each of the substrates with polyimide to a thickness of 900 Angstroms, followed by a rubbing process using the rubbing angles of approximately 90 degrees. A high-contrast liquid crystal was used which had a birefringence index (delta N) of 0.15. Each of the polarizer films 30 and 32 was 120 microns thick and had the transmissivity of 43 per cent.

The twisted-nematic liquid crystal molecules M immediately overlying the lower orientation film 26 are forced to orient in directions indicated by arrow a in FIG. 2 by means of the micro-grooves provided in the film 26. In the case of a liquid crystal which is an optically positive monoaxial substance, the major axis of the liquid crystal molecule corresponds to the Z'-axis out of the axes of optical elasticity so that the directions of arrow a in which the liquid crystal molecules M are oriented optically correspond to the Z'-axis of optical elasticity. On the other hand, the twisted-nematic liquid crystal molecules M immediately underlying the upper orientation film 24 are forced to orient in directions indicated by arrow b in FIG. 2 by means of the micro-grooves in the film 24. Since the major axes of the liquid crystal molecules M underlying the orientation film 24 are perpendicular within the limits of error of plus and minus 10 degrees to the major axes of the liquid crystal molecules M overlying the orientation film 26 as above noted, the Z'-axis determined by the upper orientation film 24 must be perpendicular within the limits of error of plus and minus 10 degrees to the Z'-axis determined by the lower orientation film 26.

On the other hand, the lower polarizer film 32 has an optical absorption axis in the direction of arrow c which is perpendicular within the limits of error of plus and minus 20 degrees to the direction of the Z'-axis determined by the upper orientation film 24 and the upper polarizer film 30 has an optical absorption axis in the direction of arrow d which is parallel within the limits of error of plus and minus 20 degrees with the direction of the Z'-axis determined by the upper orientation film 24. The liquid crystal cell having the polarizer films 30 and 32 arranged to have the mutually perpendicular optical absorption axes are used as a positively active liquid crystal cell.

Figure 3:
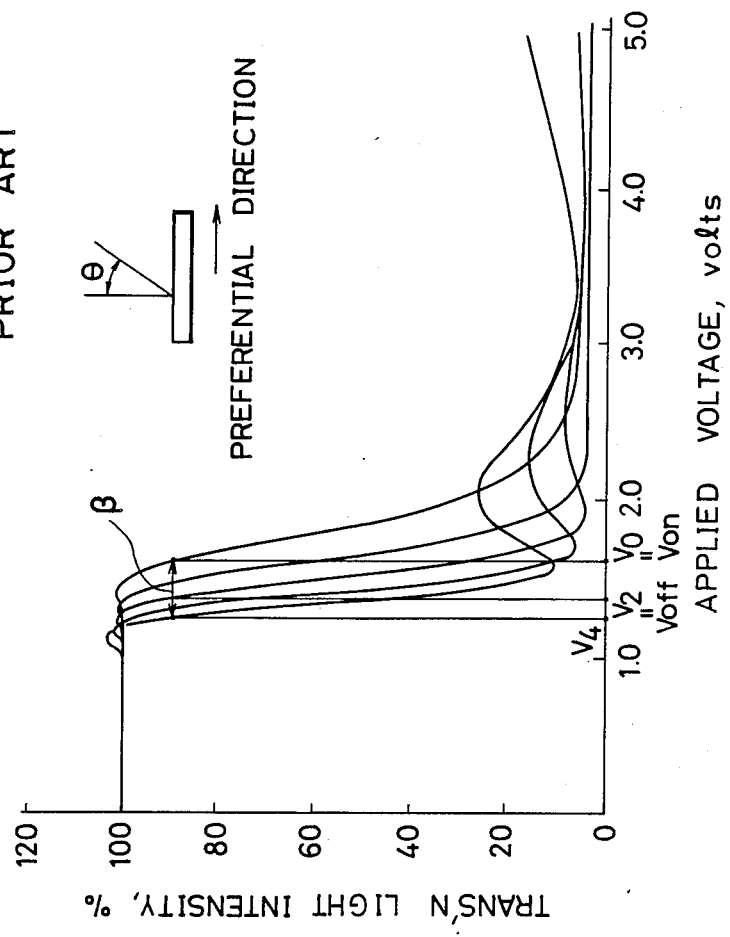
FIG. 3 is a view showing the characteristics, viz., the I–V characteristics between the transmission light intensity percentage of a prior-art liquid crystal cell in terms of the drive voltage applied to the cell.
Figure 4:
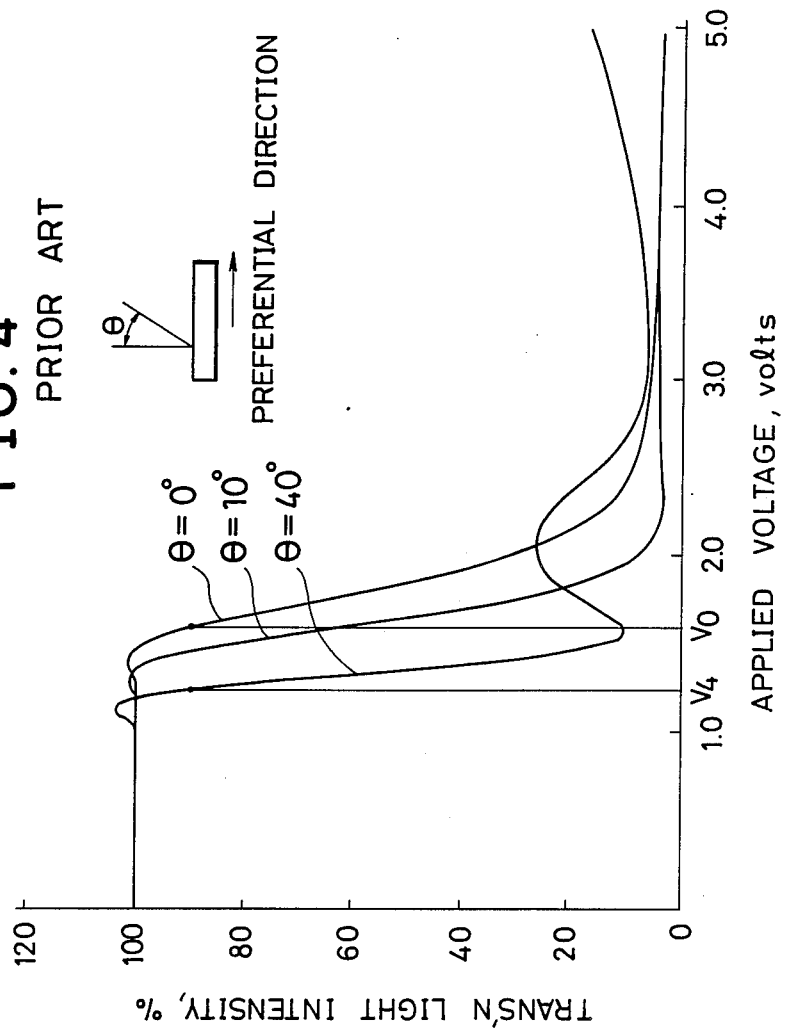
FIG. 4 is a view similar to FIG. 3 but shows some specific I–V curves extracted from among those illustrated in FIG. 3.

The view angle dependency of such a prior-art liquid crystal cell will now be evaluated with reference to FIGS. 3 and 4 each of which shows the variation of the transmission light intensity percentage in terms of the drive voltage applied to the cell as observed by the experiments conducted with the described sample cells. The curves shown in FIG. 4 have been extracted from among those illustrated in FIG. 3 and indicate the view-angle characteristics achieved when the view angle $\theta$ is selected at 0 degrees, 10 degrees and 40 degrees, respectively, and the voltages $V_0$ and $V_4$ selected at 1.60 volt and 1.25 volt, respectively. Curves thus indicating the characteristics between the transmission light intensity percentage and the applied drive voltage will be hereinafter referred to simply as I–V characteristic curves.

Assume now that the angle of preferential direction of viewing as measured from the direction normal to the display area of the liquid crystal cell is $\theta$ and that the drive voltages applied to the cell to provide a transmission light intensity percentage of 90 percent at the angles $\theta$ of 0 degrees, 10 degrees, and 40 degrees are $V_0$, $V_1$, and $V_4$, respectively. In this instance, the difference between the voltages $V_0$ and $V_4$ provides the measure $\beta$ for evaluating the view angle dependency of the liquid crystal cell. The larger the parameter $\beta$, the better the cell will be. This is accounted for by the following reasons.

According to the optimization bias method, the signal voltage $V_{on}$ to be applied to the segment electrode to be turned on and the signal voltage $V_{off}$ to be applied to the segment electrode to be turned off when the drive voltage $V_0$ is used with a duty ratio of 1/N and a bias voltage of $(1/a)V_0$ are respectively expressed as $$V_{on} = V_0/a \sqrt{\frac{N + a^2 - 1}{N}} \quad (1)$$

$$V_{off} = V_0/a \sqrt{\frac{N + (a - 2)^2 - 1}{N}} \quad (2)$$

As will be seen from these equations, the ratio $V_{on}/V_{off}$ becomes smaller as the duty number N increases, assuming the value of 1.134 when the duty number N equals 64 and the bias factor a equals 9 and the value of 1.106 when the duty number N equals 100 and the bias factor a equals 11. In an ordinary multidivisional driving system, the voltage $V_{off}$ is for this reason selected at the value $V_2$ which provides the transmission light intensity percentage of 90 per cent at any view angle which is likely to be used most frequently such as, for example, the view angle $\theta$ of 20 degrees while the voltage $V_{on}$ is determined depending upon the ratio $V_{on}/V_{off}$. Assuming that the voltage $V_{on}$ exactly equals the voltage $V_0$, the transmission light intensity percentage is 90 per cent and 30 per-cent respectively for the voltages $V_{off}$ and $V_{on}$ applied at the angle $\theta$ of 20 degrees. If the contrast ratio is defined as the reciprocal of the transmission light intensity percentage, then the contrast at a turned-on segment and the contrast at a turned-off segment as achieved at the view angle $\theta$ of 20 degrees are given as 1.11 and 3.33, respectively, so that the ratio between the contrasts at the turned-off and turned-on segments becomes 3:1. This value satisfies the requirement for achieving the contrast ratio of 3:1 providing perceivable images for display.

Assume then that the voltages $V_{off}$ and $V_{on}$ determined as discussed above are used at the view angle $\theta$ of 0 degrees. The transmission light intensity percentage to be achieved with such voltages $V_{off}$ and $V_{on}$ applied at the view angle $\theta$ of 0 degrees are given as 105 per cent and 90 per cent, respectively, providing contrasts of 0.95 and 1.11, respectively, and thus a contrast ratio of 0.86:1. These values mean that the images to be produced on the display screen under such contrast conditions can not be viewed clearly by a viewer positioned in front of the screen due to the lack of contrast.

Consideration will now be taken into account for a case where the view angle $\theta$ is 40 degrees. When the view angle $\theta$ is 40 degrees, the voltages $V_{off}$ and $V_{on}$ applied to the liquid crystal cell yield transmission light intensity percentages of 50 per cent and 10 per cent, contrasts of 2 and 10, and a contrast ratio of 2. The contrast achievable at the segment to be turned off however becomes 2 so that the crosstalk occurring between the adjacent segments is perceivable by the viewer. This phenomenon is critically objectionable from practical point of view.

As will have been understood from the foregoing discussion, the use of a large parameter $\beta$ for a liquid crystal cell results in deterioration in the view-angle characteristics of the cell and, for this reason, it is desirable to reduce the parameter $\beta$ to achieve satisfactory view-angle characteristics. The reduction in the parameter $\beta$ may be accomplished by the use of a liquid crystal having a relatively small birefringence index. A liquid crystal having a small birefringence index however limits the contrast ratios achievable by the liquid crystal cell as a whole and, thus, extreme difficulties are encountered in satisfying the requirements for both of the contrast characteristics and the view angle dependency of the cell insofar as any of the known constructions of a display device is to be relied upon.

Thus, the present invention contemplates provision of an improved multidivisional, large-sized display device which is constructed to meet the conventionally conflicting requirements for the view angle and contrast characteristics and which will thus provide directions of viewing with the optimum contrast in the directions normal to the display screen.

DESCRIPTION OF THE PREFERRED EMBODIMENTS

First Preferred Embodiment

While the liquid crystal cell of a display device embodying the present invention will be described to have its first and second polarizer films arranged to have mutually parallel optical absorption axes for use as a positively active liquid crystal cell with addition of one or two phase-shift films, the liquid crystal cell of a display device according to the present invention may have its polarizer films arranged to have mutually perpendicular optical absorption axes for use as a negatively active liquid crystal cell with addition of one or two phase-shift films.

Figure 5:
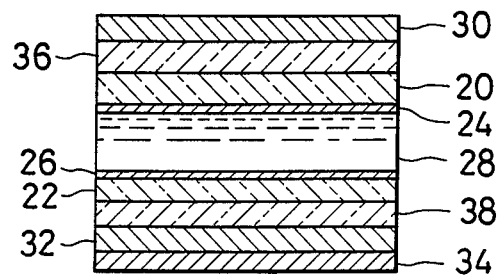
FIG. 5 is a cross sectional view showing the construction of a first preferred embodiment of a liquid crystal cell which forms part of a display device embodying the present invention.
Figure 6:
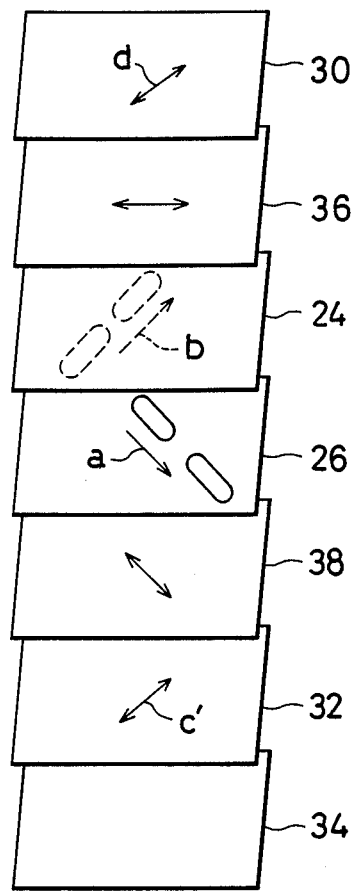
FIG. 6 is a schematic disassembled view of the liquid crystal cell shown in FIG. 5.

The liquid crystal cell to form part of a display device according to the present invention is basically similar in construction to the prior-art liquid crystal cell described with reference to FIGS. 1 and 2 and comprises all the component elements of the liquid crystal cell illustrated in to FIGS. 1 and 2. In FIGS. 5 and 6 of the drawings, the first preferred embodiment of the present invention is thus shown comprising first and second transparent glass substrates 20 and 22, first and second orientation films 24 and 26 attached to the inner faces of the substrates 20 and 22, respectively, and a layer of twisted-nematic liquid crystal 28 filling the gap between the orientation films 24 and 26.

The liquid crystal cell of the display device embodying the present invention as shown in FIGS. 5 and 6 further comprises first and second phase-shift films 36 and 38 attached to the outer faces of the glass substrates 20 and 22, respectively. On the outer faces of these phase-shift films 36 and 38 in turn are provided first and second linear polarizer films 30 and 32, respectively. The display device using the liquid crystal cell herein shown is also assumed to be of the reflection type and thus the liquid crystal cell is shown further comprising a reflector plate 34 attached to the outer face of the second polarizer film 32 as shown. If the liquid crystal cell of the display device according to the present invention is to be of the transmission type, the reflector plate 34 can be dispensed with. Though not seen in the drawings, each of the orientation films 24 and 26 is also formed with a myriad of parallel micro-grooves. The micro-grooves in the first orientation film 24 on the upper glass substrate 20 are directed at right angles to the micro-grooves in the second orientation film 26. In the neighborhood of these orientation films 24 and 26, the twisted-nematic liquid crystal molecules M in the layer 28 between the films 24 and 26 are thus forced to orient in parallel with the microgrooves in the films 24 and 26 within the limits of error of plus and minus 2 to 5 degrees to the directions of the microgrooves as in the prior-art liquid crystal cell described with reference to FIGS. 1 and 2. Furthermore, the major axes of the liquid crystal molecules M in the vicinity of one of the orientation films 24 and 26 are perpendicular within the limits of error of plus and minus 10 degrees to the major axes of the liquid crystal molecules M in the vicinity of the other orientation film as also described in connection with the described prior-art liquid crystal cell. In the description to follow, the prior-art liquid crystal cell described with reference to FIGS. 1 and 2 and thus devoid of a phase-shift film will be referred to simply as described prior-art cell.

Used as the liquid crystal 28 in the liquid crystal cell of the display device embodying the present invention is a high-contrast liquid crystal having a birefringence index of 0.15. Each of the polarizer films 30 and 32 of the first preferred embodiment is 120 microns thick and has the transmissivity of 43 per cent. Furthermore, each of the phase-shift films 36 and 38 consists of a 40 micron thick transparent web having a retardation of 200±20 millimicrons. In order to determine the optimum retardation of the phase-shift films 36 and 36, the retardation of each of the phase-shift films has been varied from 50 microns to 5000 microns to evaluate the resultant display characteristics, with the result that the optimum retardation value can be expressed by (200 ±20) × n where n is an integer. The value of retardation represented by this formula is optimum for the particular construction of the liquid crystal cell shown in FIGS. 5 and 6 and should not be considered to provide the optimum phase difference for any of the possible modifications of the shown embodiment. This is because of the fact that the optimum phase difference for a liquid crystal cell is correlated to the retardation $R_{LCD}$ which is defined by the product of the distance d between the first and second glass substrates 20 and 22 multiplied by the birefringence index of the liquid crystal 28 and for this reason can not be uniquely determined by the above formula.

As in the described prior-art cell, the twisted-nematic liquid crystal molecules M immediately overlying the second orientation film 26 in the embodiment herein shown are forced to orient in directions indicated by arrow a in FIG. 6 by means of the micro-grooves provided in the film 26. The major axis of the liquid crystal molecule corresponds to the Z'-axis out of the axes of optical elasticity so that the directions of arrow a optically correspond to the Z'-axis of optical elasticity as previously noted. On the other hand, the liquid crystal molecules M immediately underlying the first orientation film 24 are forced to orient in directions indicated by arrow b in FIG. 6 by means of the micro-grooves in the film 24. The major axes of the liquid crystal molecules M underlying the orientation film 24 being perpendicular within the limits of error of plus and minus 10 degrees to the major axes of the liquid crystal molecules M overlying the orientation film 26, the Z'-axis determined by the first orientation film 24 is perpendicular within the limits of error of plus and minus 10 degrees to the Z'-axis determined by the second orientation film 26.

The first polarizer film 30 has an optical absorption axis in the direction of arrow d which is parallel within the limits of error of plus and minus 20 degrees with the direction of the Z'-axis determined by the first orientation film 24. The second polarizer film 32 has an optical absorption axis in the direction of arrow c' which is also parallel within the limits of error of plus and minus 20 degrees with the direction of the Z'-axis determined by the first orientation film 24. The liquid crystal cell having the polarizer films 30 and 32 thus arranged to have the mutually parallel optical absorption axes is, per se, adapted to constitute a negatively active liquid crystal cell. This is contrasted by the described prior-art cell in which the polarizer films 30 and 32 are arranged to have the mutually perpendicular optical absorption axes are used as a positively active liquid crystal cell. The embodiment of FIGS. 5 and 6 is thus characterized over the described prior-art cell in that the second polarizer film 32 has its optical absorption axis approximately in parallel with the direction of the Z'-axis determined by the first orientation film 24 while, in the described prior-art cell, the second polarizer film 32 has its optical absorption axis approximately perpendicular to the direction of the Z'-axis determined by the first orientation film 24.

The first phase-shift film 36 provided between the first glass substrate 20 and the first polarizer film 30 has its Z'-axis directed to bisect, within the limits of error of plus and minus 10 degrees, the angle defined between the direction of optical absorption of the first polarizer film 30 and the directions in which the micro-grooves in the second orientation film 26 extend. On the other hand, the second phase-shift film 38 provided between the second glass substrate 22 and the second polarizer film 32 has its Z'-axis directed in parallel, within the limits of error of plus and minus 10 degrees, with the directions in which the micro-grooves in the second orientation film 26 extend. Thus, the first phase-shift film 36 has an optical axis of elasticity (Z'-axis) in a direction angled at approximately 35 degrees to the direction in which the liquid crystal molecules M are oriented by the first orientation film 24 and the second phase-shift film 38 has an optical axis of elasticity in a direction substantially parallel with the direction in which the liquid crystal molecules are oriented by the second orientation film 26.

Figure 7:
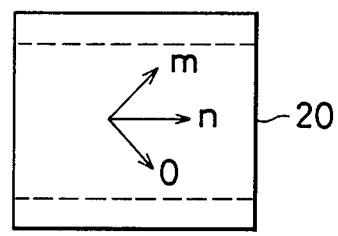
FIG. 7 is a schematic view showing in model form the relationship among the various optical directions which occur in each of the embodiment of the present invention.

FIG. 7 of the drawings shows in model form the relationship among the various directions occurring in the liquid crystal cell shown in FIGS. 5 and 6 as above described. The directions indicated by arrows m, n and o herein shown are those viewed with respect to the first glass substrate 20 of the liquid crystal cell illustrated in FIGS. 5 and 6. The direction indicated by arrow m represents the directions in which the micro-grooves in the first orientation film 24 are oriented, the direction of optical absorption of the first polarizer film 30, and the direction of optical absorption of the second polarizer film 32. The direction indicated by arrow o represents the directions in which the micro-grooves in the second orientation film 26 are oriented, and the direction of the Z'-axis of the second phase-shift film 38. The direction indicated by arrow n represents the direction of the Z'-axis of the first phase-shift film 36 and bisects the angle defined between the directions of arrows m and o within the limits of error of plus and minus 10 degrees. Thus, the angle defined between the directions of arrows m and o is approximately 90 degrees while each of the angle defined between the directions of arrows m and n and the angle defined between the directions of arrows n and o is approximately 45 degrees.

The view angle dependency of the liquid crystal cell thus constructed in accordance with the present invention will now be evaluated with reference to FIG. 8 which shows the I-V curves for the liquid crystal cell with the view angles selected at 0 degrees, 10 degrees and 40 degrees. In contrast to the described prior-art cell in which the voltages $V_0$ and $V_4$ providing the transmission light intensity percentage of 90 per cent are selected at 1.60 volt and 1.25 volt, respectively, providing the parameter $\beta$ of 0.35 volt, the voltages $V_0$ and $V_4$ are assumed to be selected at 1.50 volt and 1.45 volt, respectively, and thus provide the parameter $\beta$ of 0.50 volt. This means that there is a difference of 0.35 volt between the values $\beta$ in the described prior-art cell and the liquid crystal cell of the display device embodying the present invention. This difference of the parameter $\beta$ contributes to improvement in the view angle dependency of the liquid crystal cell of the display device embodying the present invention and has resulted from the addition of the first and second phase-shift films 36 and 38 to the described prior-art cell. By provision of these phase-shift films 36 and 38, the liquid crystal cell which would otherwise be negatively active as above noted functions as a positively active cell.

By the improvement thus achieved in the view-angle characteristics by the provision of the phase-shift films, the view-angle characteristics to be obtained when the voltages $V_{on}$ and $V_{off}$ determined by the duty number N and the bias factor a can be made optimum to provide the view angle of 0 degrees. The reasons to account for this will be hereinafter explained with reference to the I–V curves illustrated in Fig. 9 of the drawings.

The I–V curves indicated by full lines in FIG. 9 are similar to those shown in FIG. 8 and the I–V curves indicated by broken lines are similar to those shown in FIG. 4. Thus, FIG. 9 shows differences between the view-angle characteristics of the described prior-art cell and those of the first preferred embodiment of the present invention. The voltages $V_{on}$ and $V_{off}$ used for the cells are assumed to be equal to the voltages $V_1$ and $V_2$ selected for the described prior-art cell and are considered to be sufficiently reasonable for a standard multidivisional liquid crystal cell divided into 100 to 120 segments.

Assume further that the described prior-art cell provides the transmission light intensity percentage of 90 per cent when the view angles $\theta$ are selected at 10 degrees and 20 degrees, as indicated at points $P_1$ and $P_2$ in FIG. 9 and that the voltage $V_2$, viz. $V_{off}$ is selected at 1.38 volt. In this instance, the transmission light intensity percentage achieved by the turned-off segment at the view angle $\theta$ of 40 degrees becomes 40 per cent as indicated at point $P_3$ in FIG. 9. The voltage t be applied to achieve the same transmission light intensity percentage in the first preferred embodiment of the present invention is however 1.69 volt as indicated at point $P_4$ and is thus more than 0.30 volt higher than in the described prior-art cell due to the reduction in the parameter $\beta$.

The ratio $V_{on}/V_{off}$ in the described prior-art cell is given as $V_1/V_2 = 1.07$. When this ratio is applied to the liquid crystal cell of the display device embodying the present invention and the voltage providing the transmission light intensity percentage at the view angle $\theta$ of 40 degrees is now defined by the voltage $V_{off}$, then the voltage $V_{on}$ is calculated as $1.07 \times 1.69 = 1.81$ volt. The voltage providing the transmission light intensity percentage with this voltage 1.81 applied at the view angle $\theta$ of 10 degrees is given as 45 per cent as indicated at point $P_5$ in FIG. 9. This means that, if the voltage $V_{off}$ is selected at the value providing the transmission light intensity percentage of 40 per cent at the view angle $\theta$ of 40 degrees and then the view angle $\theta$ is shifted from 40 degrees to 10 degrees, the transmission light intensity percentage achieved by the turned-on segment in the embodiment of the present invention decreases to 43 per cent as indicated at point $P_5$ in contrast to 90 per cent in the described prior-art cell as indicated at point $P_1$ in FIG. 9. Considering that the contrast of a display on a liquid crystal display device is ordinarily perceived by an ordinary viewer of the display in relevance to the degrees to which the turned-off segments of the cell are darkened out, the changeover of the transmission light intensity percentage from 90 per cent to 43 per cent at the view angle $\theta$ of 10 degrees as above discussed directly means an increase in the contrast of the display viewed by a person positioned in front of the display screen and accordingly a shift of the view angle toward the direction normal to the screen. Such a phenomenon is tantamount to the effect be achieved by the use of a Fresnel lens as previously discussed.

The decrease in the parameter $\beta$ will further contribute to expanding the range of optimum view angles toward higher view angle values. The transmission light intensity percentage achieved with the voltage $V_{off}$ applied at the view angle $\theta$ of 40 degrees is 40 percent as indicated at point $P_3$ in FIG. 9 in the case of the described prior-art cell, while in the first preferred embodiment of the present invention, the transmission light intensity percentage achieved under the same conditions is increased to 95 per cent as indicated at point $P_6$ in FIG. 9. This means that the view angle $\theta$ providing the transmission light intensity percentage of 40 per cent in response to application of the voltage $V_{off}$ is larger than 40 degrees. This in turn means that the range of optimum view angles is expanded toward higher view angle values as above mentioned.

Figure 10:
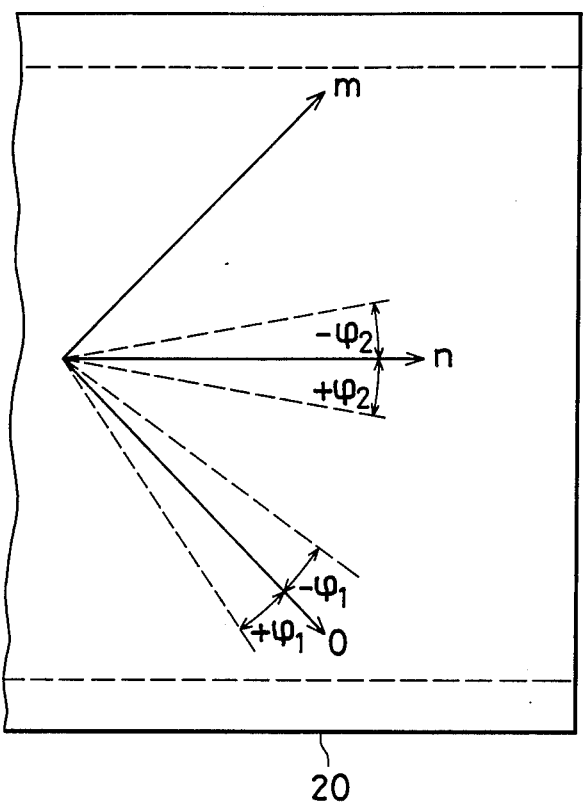
FIG. 10 is view similar to FIG. 7 but now shows an example of the relationship among the various optical directions which occur in a modification of the first preferred embodiment of the present invention.

It has been assumed that the angle between the directions of arrows m and o in FIG. 7 is approximately 90 degrees and each of the angles between the directions of arrows m and n and between the directions of arrows n and o is approximately 45 degrees. The present invention can however be embodied by modifying such relationship among the directions of arrows m, n and o shown in FIG. 7 to improve the performance characteristics of the first preferred embodiment of the invention. FIG. 10 of the drawings is similar to FIG. 7 but now shows an example of the relationship among the directions of arrows m, n and o as implemented in such a modification of the first preferred embodiment of the present invention.

The relationship among the directions of arrows m, n and o in the modification of the first preferred embodiment of the present invention is achieved with the first and second phase-shift films 36 and 38 rotated with respect to the substrates 20 and 22 about an axis normal to the films through angles of $\pm\phi_1$ and $\pm\phi_2$, respectively, from their positions illustrated in FIGS. 5 and 6. The plus and minus signs "±" and "−" herein used indicate the rotation of each of the phase-shift films 36 and 38 in clockwise and counterclockwise directions in Fig. 10, viz., when the films are viewed from above the cell shown in FIG. 7. The subscripts 1 and 2 affixed to the letter $\phi$ indicate that the angles of rotation are of the first and second phase-shift films 36 and 38, respectively.

Figure 11:
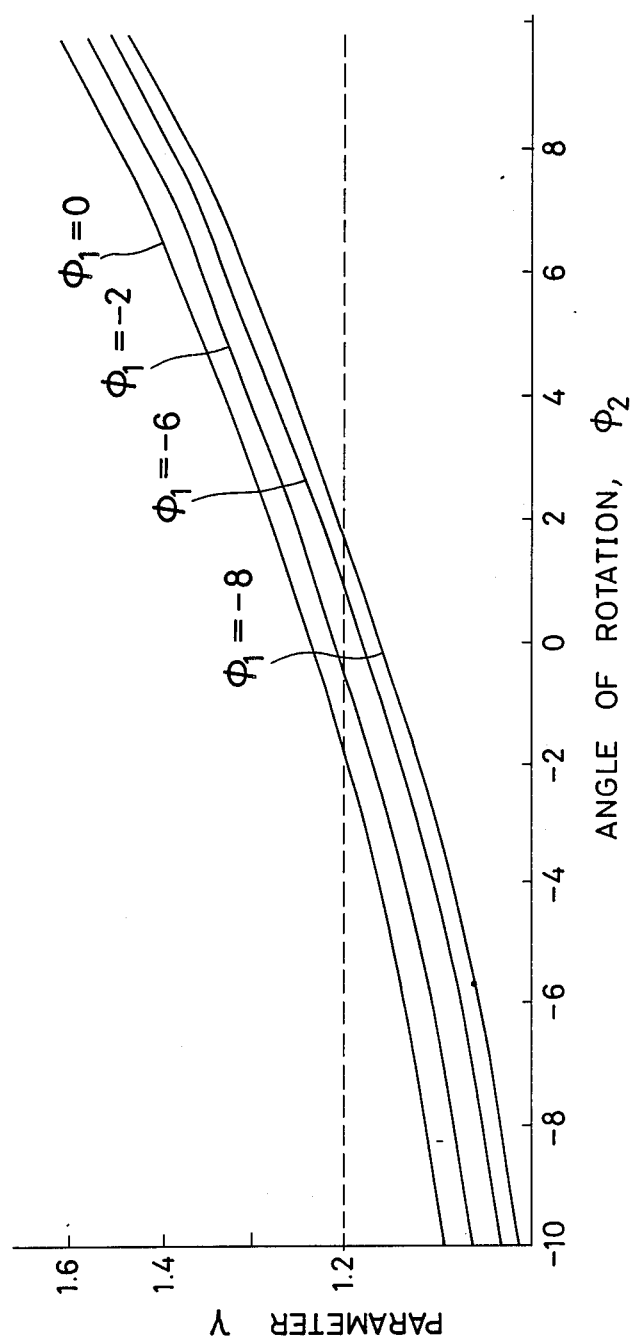
FIG. 11 is a graph showing curves which indicate the variation in the value $\gamma$ as achieved in the liquid crystal cell of a display device according to the present invention when the phase-shift films forming part of the cell are rotated through angles varied independently of each other.

FIG. 11 of the drawings shows curves indicating the variation in the parameter $\gamma$ as achieved in the modified first preferred embodiment of the present invention when the angles of rotation $\phi_1$ and $\phi_2$ are varied independently of each other. The parameter $\gamma$ is indicative of the ratio between the voltages respectively providing the transmission light intensity percentages of 90 per cent and 50 per cent at the view angle $\theta$ of 0 degrees. The parameter $\gamma$ is thus used a measure to evaluate the quality of the matrix characteristics of a liquid crystal cell and becomes more preferable as it becomes closer to 1:1. As will be seen from the plots of FIG. 11, the parameter $\gamma$ is improved as the first phase-shift film 36 is rotated counterclockwise in FIG. 10 and the second phase-shift film 38 rotated clockwise in FIG. 10 until the value reaches the value of 1.03 which surprisingly less than the order of 1.1 as observed in conventional liquid crystal cells. In consideration of the parameter $\gamma$ of such an order in conventional of rotation $\phi_1$ of the first phase-shift film 36 be less than 0 degrees and the angle of rotation $\phi_2$ of the second phase-shift film 38 be more than about 0 degrees and less than about ten degrees to provide values of $\gamma$ less than 1.2 indicated by a horizontal broken line in FIG. 11. The characteristics curves shown in FIG. 11 indicate that the parameter $\gamma$ might be improved even infinitely if both of the first and second phase-shift films 36 and 38 ar rotated in certain directions with respect to the substrates 20 and 22 but. It has on the other hand been found that the angles of rotation of the phase-shift films should not exceed certain definite values. The reason for this will be hereinafter explained with reference to FIG. 12.

Figure 12:
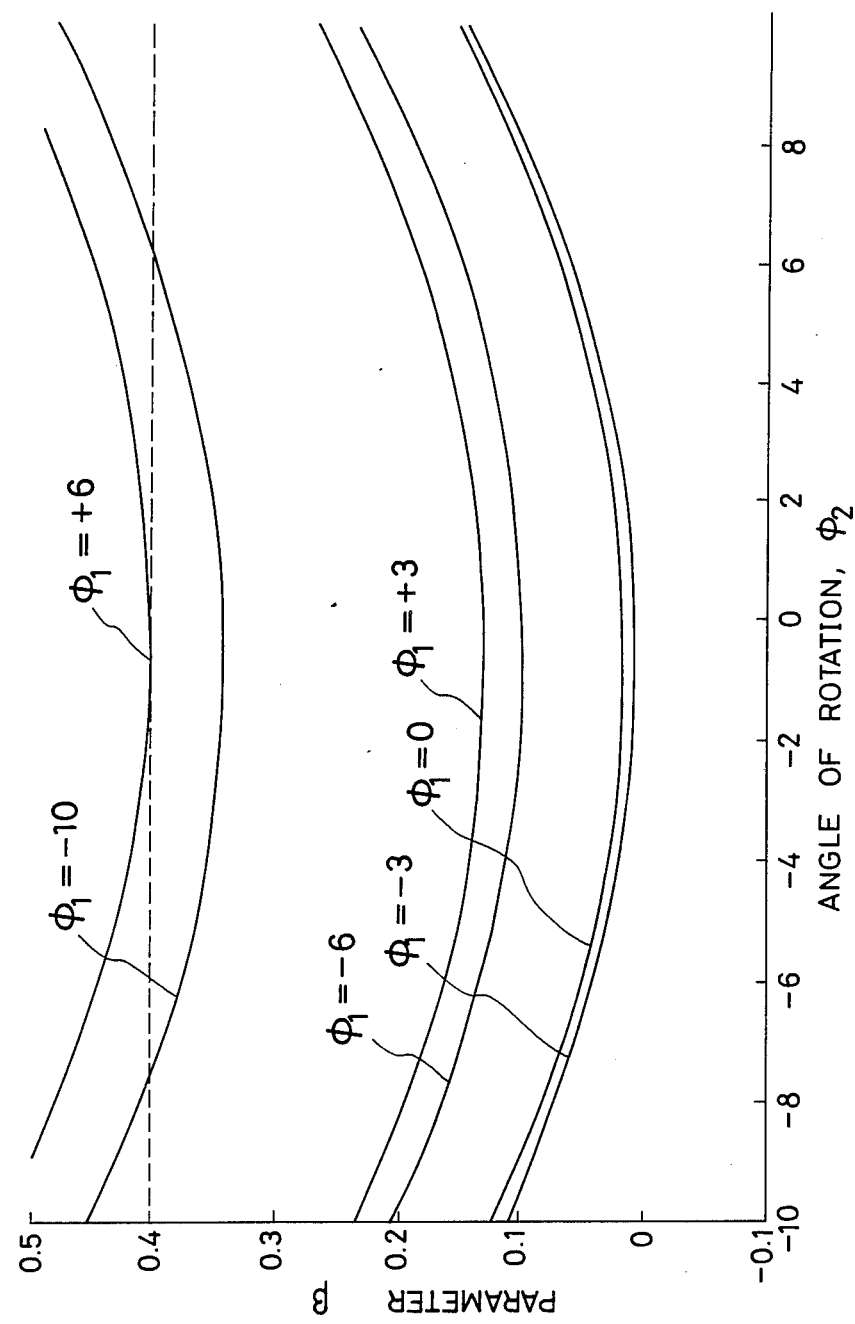
FIG. 12 is a graph showing curves which indicate the variation in the value $\beta$ in response to various combinations of the angles of rotation of the phase-shift films in the liquid crystal cell of a display device according to the present invention.

FIG. 12 of the drawings shows the variation in the parameter $\beta$ ($V_0 - V_4$) in response to various combinations of the angles of rotation $\phi_1$ and $\phi_2$ of the first and second phase-shift films 36 and 38 forming part of the first preferred embodiment of the present invention modified as discussed above. It will be seen from this FIG. 12 that the angle of rotation of each of the first and second phase-shift films 36 and 38 has a particular value providing the minimum value of the parameter $\beta$ for a liquid crystal cell without respect to the angle of rotation of the other phase-shift film and that the parameter $\beta$ for the cell increases if the angle of rotation of either or each of the phase-shift films 36 and 38 becomes larger than the particular value of angle. Considering that the parameter $\beta$ of an ordinary twisted-nematic liquid crystal cell is of the order of 0.4 volt, the range of the angles of rotation is between $-10$ degrees and $\pm 6$ degrees for the first phase-shift film 36 and between $-10$ degrees and $\pm 10$ degrees for the second phase-shift film 38. These ranges of the angles of rotation $\phi_1$ and $\phi_2$ are herein assumed to be preferable for achieving salient effects in improving the parameter $\gamma$ for the liquid crystal cell of a display device according to the present invention.

As will be understood from the above analyses, the angles of rotation $\phi_1$ and $\phi_2$ effective to improve the parameter $\gamma$ of the liquid crystal cell of a display device according to the present invention are, as above pointed out with reference to FIG. 11, respectively given within the ranges of $$\phi_1 \leq 0, \text{ and } 0 < \phi_2 < 10$$
(3)

On the other hand, the angles of rotation $\phi_1$ and $\phi_2$ which contribute to the improvement in the parameter $\beta$ of the liquid crystal cell of display device according to the present invention are, as above discussed with reference to FIG. 12, respectively given within the ranges of $$-10 \leq \phi_1 \leq 6, \text{ and } -10 \leq \phi_2 \leq 10$$
(4)

The conditions for achieving significant improvements in both of the values and $\beta$ are therefore expressed as $$-10 \leq \phi_1 \; 23 \; 6, \text{ and } 0 \leq \phi_2 \leq 10.$$

Under these conditions, the first phase-shift film 36 optical axis of elasticity (Z'-axis) in a direction angled at 35 degrees to 45 degrees to the direction in which the liquid crystal molecules M are oriented by the first orientation film 24 and the second phase-shift film 38 has an optical axis of elasticity in a direction angled at $-10$ degrees to 0 degrees to the direction in which the liquid crystal molecules M are oriented by the second orientation film 26.

Second Preferred Embodiment

Figure 13:
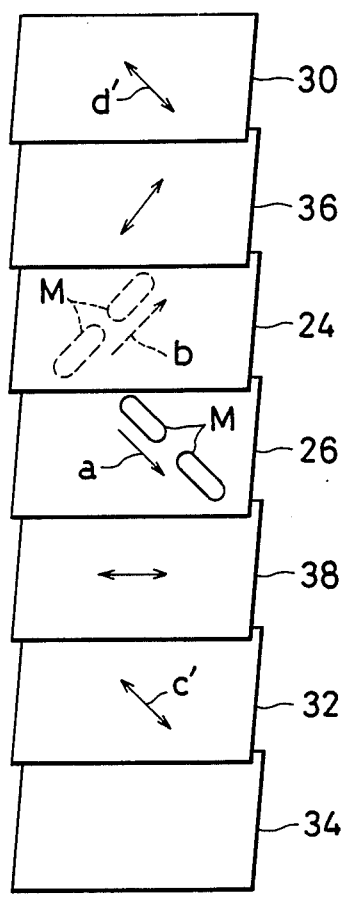
FIG. 13 is a schematic disassembled view of a liquid crystal cell essentially similar in construction to the liquid crystal cell shown in FIG. 5 but forming a second preferred embodiment of the present invention.

FIG. 13 of the drawings shows a second preferred embodiment of the present invention. The embodiment herein shown is basically similar in construction to the first preferred embodiment described with reference to FIGS. 5 and 6 or the described modification thereof. In the embodiment herein shown, the first and second polarizer films 30 and 32 are redirected with respect to the substrates 20 and 22 so that the optical absorption axis of each of the polarizer films 30 and 32 is rotated with respect to the substrates 20 and 22 through an angle of 90 degrees about an axis normal to the film from the direction of the optical absorption axis of each of the polarizer films 30 and 32 in the liquid crystal cell illustrated in FIGS. 5 and 6. The directions of the optical absorption axes of the polarizer films 30 and 32 are thus indicated by arrows d' and c, respectively in FIG. 13. Furthermore, the first phase-shift film 36 in the embodiment herein shown is redirected with respect to the substrates 20 and 22 so that the Z'-axis of the phase-shift film 36 is also rotated with respect to the substrates 20 and 22 also through the angle of 90 degrees about an axis normal to the phase-shift film from the direction of the Z'-axis of the phase-shift film 36 in the liquid crystal cell illustrated in FIGS. 5 and 6. The directions in which the micro-groove extend in the first and second orientation films 24 and 26 are respectively identical with those in the liquid crystal cell illustrated in FIGS. 5 and 6.

Thus, the first polarizer film 30 has an optical absorption axis in the direction of arrow d' which is parallel within the limits of error of plus and minus 20 degrees with the direction of the Z'-axis determined by the second orientation film 26. The second polarizer film 32 has an optical absorption axis in the direction of arrow c which is also parallel within the limits of error of plus and minus 20 degrees with the direction of the Z'-axis determined by the second orientation film 26. The liquid crystal cell shown in FIG. 13 thus has its polarizer films 30 and 32 arranged to have the mutually parallel optical absorption axes and is per se also adapted to constitute a negatively active liquid crystal cell.

The first phase-shift film 36 provided between the first glass substrate 20 and the first polarizer film 30 has its Z'-axis directed in parallel, within the limits of error of plus and minus 10 degrees, with the Z'-axis determined by the first orientation film 24. On the other hand, the second phase-shift film 38 provided between the second glass substrate 22 and the second polarizer film 32 has its Z'-axis directed to bisect, within the limits of error of plus and minus 10 degrees, the angle defined between the Z'-axis determined by the first orientation film 24 and the direction of optical absorption of the first polarizer film 30.

In the relationship among the directions m, n and o shown in FIG. 7, the direction of arrow m now represents the directions in which the micro-grooves in the first orientation film 24 are oriented, and the direction of the Z'-axis of the first phase-shift film 3 in the liquid crystal cell illustrated in FIG. 13. The direction of arrow o represents the direction of optical absorption of the first polarizer film 30, the direction of optical absorption of the second polarizer film 32, and the directions in which the micro-grooves in the second orientation film 26 are oriented. The direction indicated by arrow n represents the direction of the Z'-axis of the second phase-shift film 38 and bisects the angle defined between the directions of arrows m and o within the limits of error of plus and minus 10 degrees.

Figure 14:
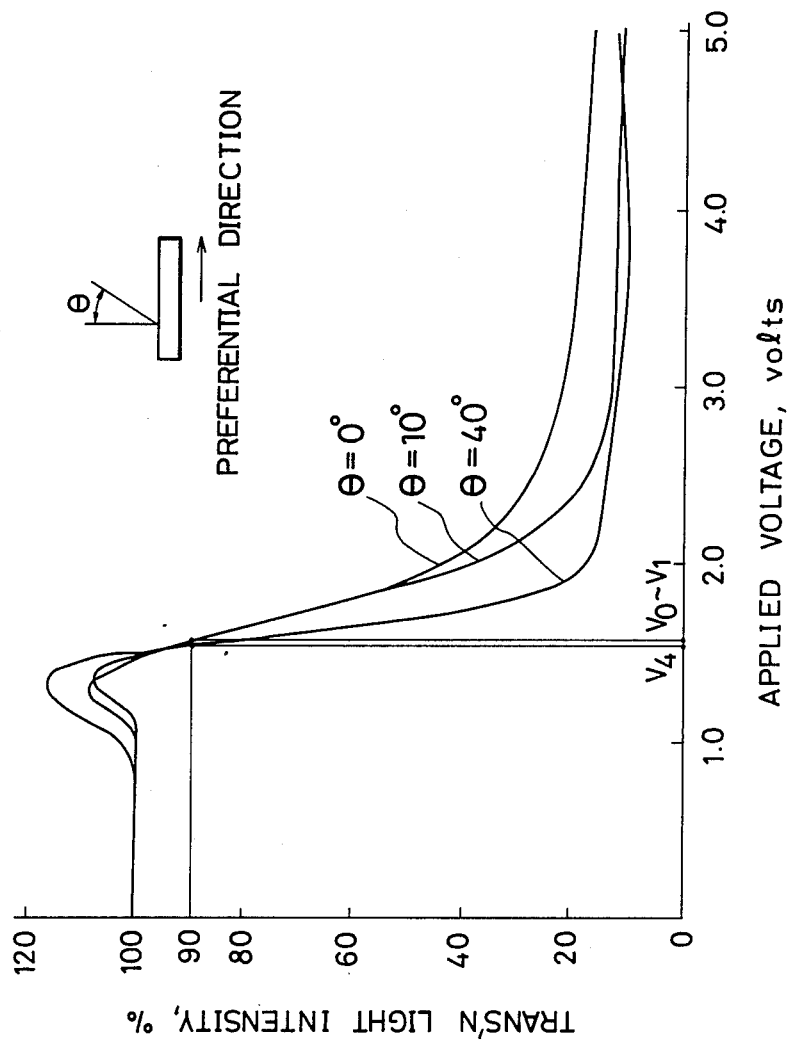
FIG. 14 is a graph showing I–V curves for the second preferred embodiment of the present invention with the view angles selected at predetermined degrees.

FIG. 14 shows I-V curves for the embodiment illustrated in FIG. 13, wherein the angles of rotation $\phi_1$ and $\phi_2$ of the first and second phase-shift films 36 and 38 are assumed to be zeros. Comparison of these curves with the I-V curves shown in FIG. 8 will suggest that the voltages $V_0$ to $V_4$ are higher about 80 millivolts than those in the characteristics shown in FIG. 8 but that the decreasing tendency of the parameter $\beta$ as the measure for evaluating the view-angle characteristics of the liquid crystal cell is maintained and will therefore provide the effects comparable to those which can be achieved by the first preferred embodiment of the invention.

Third Preferred Embodiment

Figure 15:
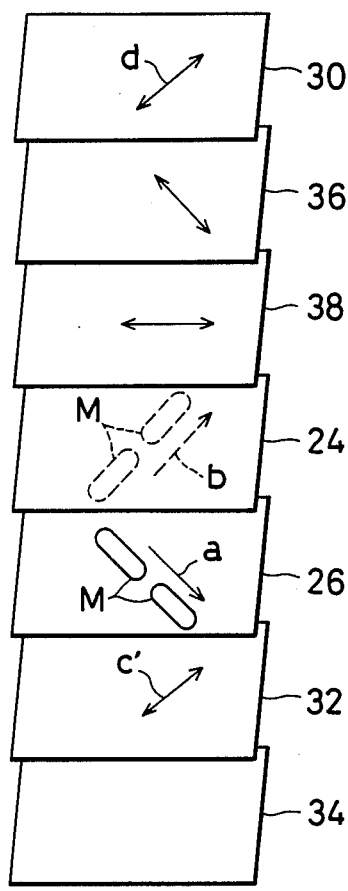
FIG. 15 is a schematic disassembled view showing the construction of a third preferred embodiment of a liquid crystal cell of a display device embodying the present invention.

FIG. 15 of the drawings shows a third preferred embodiment of the present invention. The third preferred embodiment of the invention is also basically similar in construction to the described prior-art cell and is thus shown comprising first and second transparent glass substrates 20 and 22, first and second orientation films 24 and 26 attached to the inner faces of the substrates 20 and 22, respectively, a layer of twisted-nematic liquid crystal 28 filling the gap between the orientation films 24 and 26, and first and second linear polarizer films 30 and 32 overlying and underlying the substrates 20 and 22, respectively. The second polarizer film 32 is attached directly to the outer face of the second glass substrate 22 as shown.

The third preferred embodiment of the present invention as herein shown further comprises first and second phase-shift films 36 and 38 which intervene between the first glass substrate 20 and the first polarizer film 30. The second phase-shift film 38 is attached directly to the outer face of the first glass substrate 20, and the first phase-shift film 36 has one of its faces attached to the outer face of the second phase-shift film 38 and the other of its faces attached to the inner face of the first polarizer film 30. The display device using the liquid crystal cell herein shown is also assumed to be of the reflection type and thus the liquid crystal cell is shown further comprising a reflector plate 34 attached to the outer face of the second polarizer film 32 as shown. Microgrooves are formed in each of the first and second orientation films 24 and 26 so that the liquid crystal molecules M immediately underlying and overlying the orientation film 24 are forced to orient in parallel with the micro-grooves in the films 24 and 26, respectively, within the limits of error of plus and minus 2 to 5 degrees to the directions of the microgrooves, as indicated by arrows a and b. Furthermore, the major axes of the liquid crystal molecules M in the vicinity of one of the orientation films 24 and 26 are perpendicular within the limits of error of plus and minus 10 degrees to the major axes of the liquid crystal molecules M in the vicinity of the other orientation film.

Also used as the liquid crystal 28 in the liquid crystal cell of the display device embodying the present invention is a high-contrast liquid crystal having a birefringence index of 0.15. Each of the polarizer films 30 and 32 of the first preferred embodiment is 120 microns thick and has the transmissivity of 43 per cent. Furthermore, each of the phase-shift films 36 and 38 consists of a 40 micron thick transparent web having a retardation of 200±20 millimicrons for the reason explained in connection with the embodiment described with reference to FIGS. 5 and 6.

The first polarizer film 30 has an optical absorption axis in the direction of arrow d which is parallel within the limits of error of plus and minus 20 degrees with the direction of the Z'-axis determined by the first orientation film 24. The second polarizer film 32 has an optical absorption axis in the direction of arrow c' which is also parallel within the limits of error of plus and minus 20 degrees with the direction of the Z'-axis determined by the first orientation film 24. The liquid crystal cell having the polarizer films 30 and 32 thus arranged to have the mutually parallel optical absorption axes is ordinarily operable as a negatively active liquid crystal cell as previously noted. The embodiment of FIG. 15 is thus also characterized over the described prior-art cell in that the second polarizer film 32 has its optical absorption axis approximately in parallel with the direction of the Z'-axis determined by the first orientation film 24 while, in the described prior-art cell, the second polarizer film 32 has its optical absorption axis approximately perpendicular to the direction of the Z'-axis determined by the first orientation film 24.

The second phase-shift film 38 provided between the first glass substrate 20 and the first phase-shift film 36 has its Z'-axis directed to bisect, within the limits of error of plus and minus 10 degrees, the angle defined between the direction of optical absorption of the first polarizer film 30 and the directions in which the micro-grooves in the second orientation film 26 extend. On the other hand, the first phase-shift film 38 provided between the first phase-shift film 38 and the first polarizer film 30 has its Z'-axis directed in parallel, within the limits of error of plus and minus 10 degrees, with the directions in which the micro-grooves in the second orientation film 26 extend.

In the relationship among the directions m, n and o shown in FIG. 7, the direction indicated by arrow m represents the directions in which the micro-grooves in the first orientation film 24 are oriented, the direction of optical absorption of the first polarizer film 30, and the direction of optical absorption of the second polarizer film 32. The direction indicated by arrow o represents the directions in which the micro-grooves in the second orientation film 26 are oriented, and the direction of the Z'-axis of the first phase-shift film 36. The direction indicated by arrow n represents the direction of the Z'-axis of the second phase-shift film 38 and bisects the angle defined between the directions of arrows m and o within the limits of error of plus and minus 10 degrees.

Figure 16:
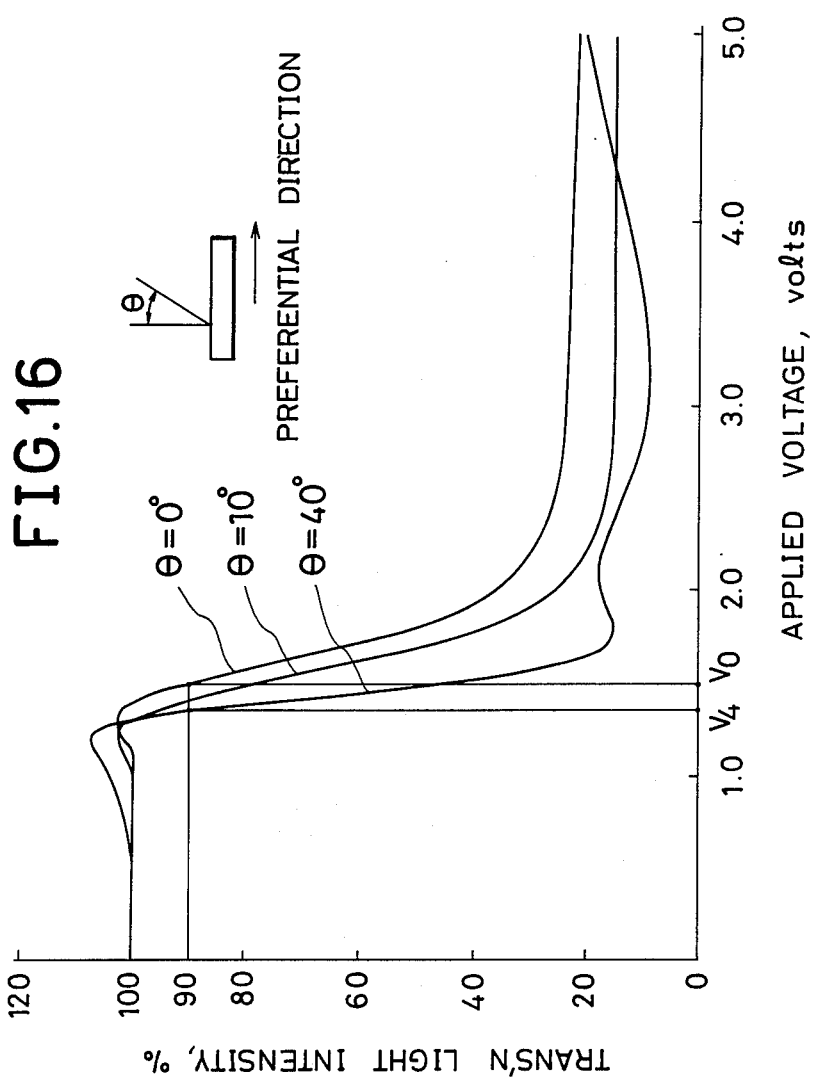
FIG. 16 is a graph showing I–V curves for the third preferred embodiment of the present invention with the view angles selected at predetermined degrees.

The view angle dependency of the liquid crystal cell thus constructed in accordance with the present invention will now be evaluated with reference to FIG. 16 which shows the I-V curves for the liquid crystal cell with the view angles selected at 0 degrees, 10 degrees and 40 degrees. The voltages $V_0$ and $V_4$ are in this instance assumed to be selected at 1.50 volt and 1.34 volt, respectively, and thus provide the parameter $\beta$ of 0.16 volt. This means that there is a difference of 0.19 volt between the values $\beta$ in the described prior-art cell and the embodiment under consideration. This difference of the parameter $\beta$ contributes to improvement in the view angle dependency of the third preferred embodiment of the present invention and has also resulted from the addition of the first and second phase-shift films 36 and 38 to the described prior-art cell. By provision of these phase-shift films 36 and 38, the embodiment under consideration also functions as a positively active cell.

Figure 17:
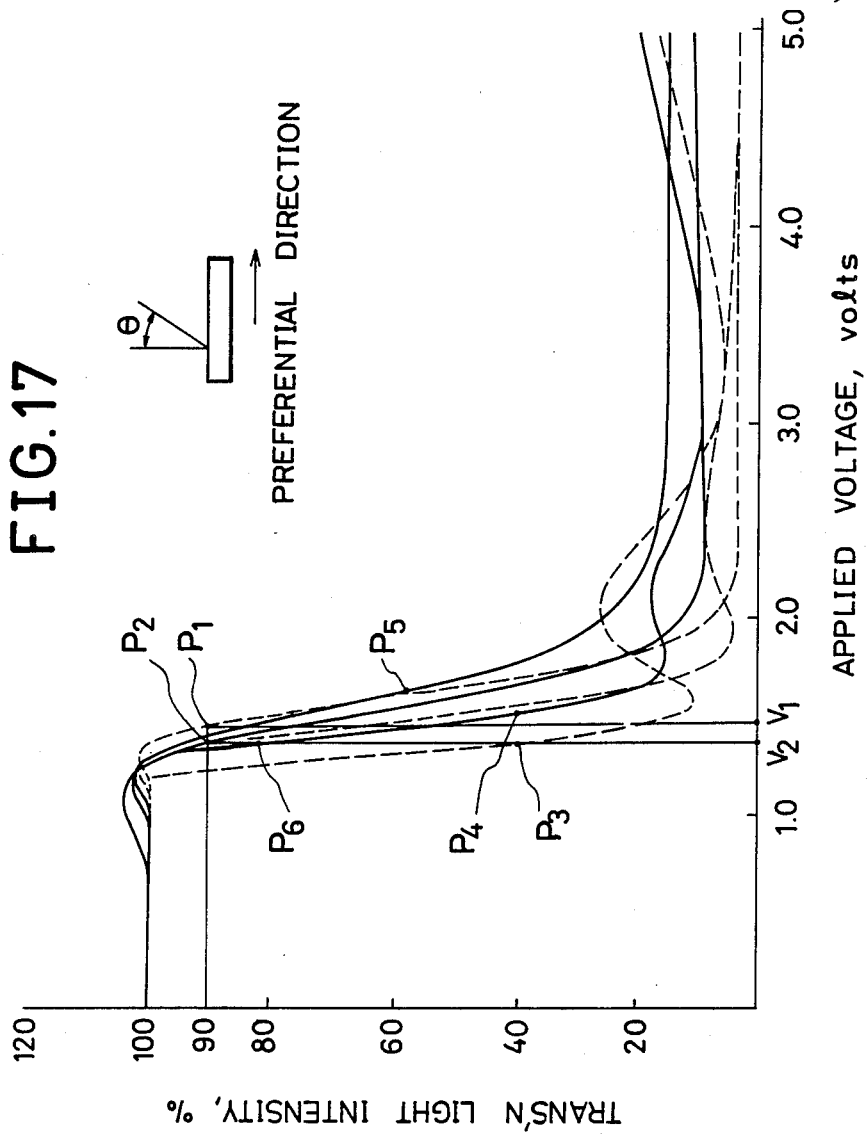
FIG. 17 is a graph showing I–V curves similar to those shown in FIG. 4 and I–V curves similar to those shown in FIG. 16 for comparison between the view-angle characteristics of the prior-art liquid crystal cell and those of the third preferred embodiment of the present invention.

In FIG. 17 of the drawings, I-V curves indicated by full lines are similar to those shown in FIG. 16 and the I-V curves indicated by broken lines are similar to those shown in Fig. 4. Thus, FIG. 17 shows differences between the view-angle characteristics of the described prior-art cell and those of the third preferred embodiment of the present invention. The voltages $V_{on}$ and $V_{off}$ used for the cells are assumed to be equal to the voltages $V_1$ and $V_2$ selected for the described prior-art cell. As previously noted, the transmission light intensity percentage achieved by the turned-off segment at the view angle $\theta$ of 40 degrees in the described prior-art cell is 40 per cent as indicated at point $P_3$ in FIG. 17. The voltage to be applied to achieve the same transmission light intensity percentage in the third preferred embodiment of the present invention is however 1.53 volt as indicated at point $P_4$ and is thus more than 0.14 volt higher than in the described prior-art cell due to the reduction in the parameter $\beta$.

The ratio $V_{on}/V_{off}$ in the described prior-art cell is given as $V_1/V_2 = 1.07$ as previously noted. When this ratio is applied to the embodiment under consideration and the voltage providing the transmission light intensity percentage at the view angle $\theta$ of 40 degrees is defined by the voltage $V_{off}$, then the voltage $V_{on}$ is calculated as $1.07 \times 1.53 = 1.64$ volt. The voltage providing the transmission light intensity percentage with this voltage 1.64 applied at the view angle $\theta$ of 10 degrees is given as 58 per cent as indicated at point $P_5$ in FIG. 17. This also means that, if the voltage $V_{off}$ is selected at the value providing the transmission light intensity percentage of 40 per cent at the view angle $\theta$ of 40 degrees and then the view angle $\theta$ is shifted from 40 degrees to 10 degrees, the transmission light intensity percentage achieved by the turned-on segment in the embodiment of the present invention decreases to 58 per cent as indicated at point $P_5$ in contrast to 90 per cent in the described prior-art cell as indicated at point $P_1$ in FIG. 17. The changeover of the transmission light intensity percentage from 90 per cent to 58 per cent at the view angle $\theta$ of 10 degrees as above discussed directly means an increase in the contrast of the display viewed by a person positioned in front of the display screen and accordingly a shift of the view angle toward the direction normal to the screen. In the third preferred embodiment of the present invention, furthermore, the transmission light intensity percentage is increased to 82 per cent as indicated at point $P_6$ in FIG. 9. This means that the view angle $\theta$ providing the transmission light intensity percentage of 40 per cent in response to application of the voltage $V_{off}$ is larger than 40 degrees and accordingly that the range of optimum view angles is expanded toward higher view angle values also in the third preferred embodiment of the present invention.

Fourth Preferred Embodiment

Figure 18:
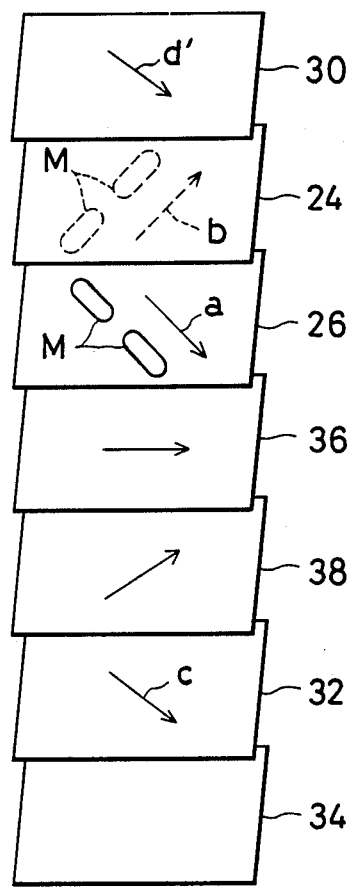
FIG. 18 is a schematic disassembled view of a liquid crystal cell essentially similar in construction to the liquid crystal cell shown in FIG. 15 but forming a fourth preferred embodiment of the present invention.

FIG. 18 of the drawings shows a fourth preferred embodiment of the present invention. The embodiment herein shown is basically similar in construction to the third preferred embodiment described with reference to FIG. 15. In the embodiment herein shown, the first and second phase-shift films 36 and 38 are provided between the second glass substrate 22 and the second polarizer film 32 with the first polarizer film 30 attached directly to the outer face of the first glass substrate 20 as shown. The first phase-shift film 36 is attached to the inner face of the second glass substrate 20, and the second phase-shift film 38 has one of its faces attached to the inner face of the first phase-shift film 36 and the other of its faces attached to the outer face of the second polarizer film 32. Furthermore, the first and second polarizer films 30 and 32 are redirected with respect to the substrates 20 and 22 so that the optical absorption axis of each of the polarizer films 30 and 32 is rotated with respect to the substrates 20 and 22 through an angle of 90 degrees about an axis normal to the film from the direction of optical absorption axis of each of the polarizer films 30 and 32 in the liquid crystal cell illustrated in FIG. 15. Directions of the optical absorption axes of the films 30 and 32 are thus indicated by arrows d' and c, , in FIG. 18. In addition, the second phase-shift 38 in the embodiment herein shown is redirected with respect to the substrates 20 and 22 so that the Z'-axis of the phase-shift film 38 is also rotated with respect to the substrates 20 and 22 through the angle of 90 degrees about an axis normal to the phase-shift film from the direction of the Z'-axis of the phase-shift film 38 in the liquid crystal cell illustrated in FIG. 15. The directions in which the micro-groove extend in the first and second orientation films 24 and 26 are respectively identical with those in the liquid crystal cell illustrated in FIG. 15.

Thus, the first polarizer film 30 has an optical absorption axis in the direction of arrow d' which is parallel within the limits of error of plus and minus 20 degrees with the direction of the Z'-axis determined by the second orientation film 26. The second polarizer film 32 has an optical absorption axis in the direction of arrow c which is also parallel within the limits of error of plus and minus 20 degrees with the direction of the Z'-axis determined by the second orientation film 26. The liquid crystal cell shown in FIG. 18 thus has its polarizer films 30 and 32 arranged to have the mutually parallel optical absorption axes and is also used as a negatively active liquid crystal cell.

The first phase-shift film 36 provided between the second glass substrate 22 and the second phase-shift film 38 has its Z'-axis directed to bisect, within the limits of error of plus and minus 10 degrees, the angle defined between the Z'-axis determined by the first orientation film 24 and the direction of optical absorption of the first polarizer film 30. On the other hand, the second phase-shift film 38 provided between the first phase-shift film 36 and the second polarizer film 32 has its Z'-axis directed in parallel, within the limits of error of plus and minus 10 degrees, with the Z'-axis determined by the first orientation film 24.

In the relationship among the directions m, n and o shown in FIG. 7, the direction of arrow m now represents the directions in which the micro-grooves in the first orientation film 24 are oriented, and the direction of the Z'-axis of the second phase-shift film 38 in the liquid crystal cell illustrated in FIG. 18. The direction of arrow o represents the direction of optical absorption of the first polarizer film 30, the direction of optical absorption of the second polarizer film 32, and the directions in which the micro-grooves in the second orientation film 26 are oriented. The direction indicated by arrow n represents the direction of the Z'-axis of the first phase-shift film 36 and bisects the angle defined between the directions of arrows m and o within the limits of error of plus and minus 10 degrees.

Figure 19:
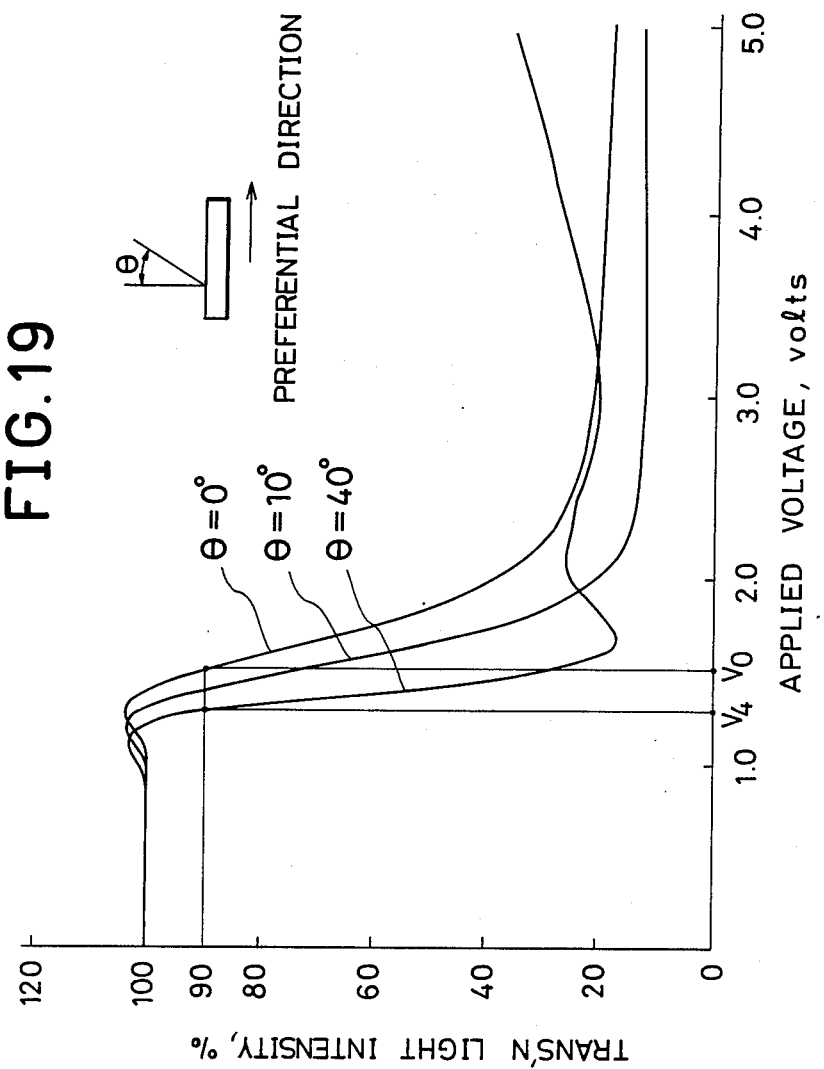
FIG. 19 is a graph showing I–V curves for the fourth preferred embodiment of the present invention with the view angles selected at predetermined degrees.

FIG. 19 shows I-V curves for the embodiment illustrated in FIG. 18. From this FIG. 19 it will be seen that the voltages $V_0$ to $V_4$ are slightly higher than those in the characteristics shown in FIG. 8 but that the decreasing tendency of the parameter $\beta$ as the measure for evaluating the view-angle characteristics of the liquid crystal cell is still maintained and will therefore provide the effects comparable to those which can be achieved by the first preferred embodiment of the invention.

Fifth Preferred Embodiment

Figure 20:
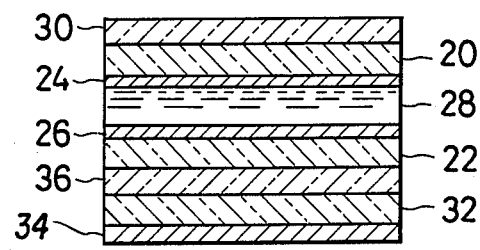
FIG. 20 is a cross sectional view showing the construction of a fifth preferred embodiment of a liquid crystal cell of a display device embodying the present invention.
Figure 21:
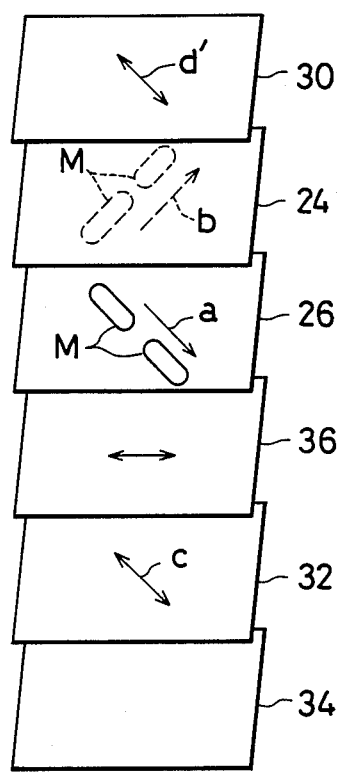
FIG. 21 is a schematic disassembled view showing the construction of the liquid crystal cell shown in FIG. 20.

FIGS. 20 and 21 of the drawing shows a fifth preferred embodiment of the present invention. The fifth preferred embodiment of the invention is also basically similar in construction to the described prior-art cell and is thus shown comprising first and second transparent glass substrates 20 and 22, first and second orientation films 24 and 26 attached to the inner faces of the substrates 20 and 22, respectively, a layer of twisted-nematic liquid crystal 28 filling the gap between the orientation films 24 and 26, and first and second linear polarizer films 30 and 32 overlying and underlying the substrates 20 and 22, respectively. The second polarizer film 32 is attached directly to the outer face of the second glass substrate 22 as shown and a reflector plate 34 is attached to the outer face of the second polarizer film 32. All the component elements of the fifth preferred embodiment of the present invention are similar to those of each of the embodiments thus far been described.

The fifth preferred embodiment of the present invention as herein shown further comprises a single phase-shift film 36 which intervenes between the second glass substrate 22 and the second polarizer film 32. The first polarizer film 30 has an optical absorption axis in the direction of arrow d' which is parallel within the limits of error of plus and minus 20 degrees with the direction of the Z'-axis determined by the second orientation film 26. The second polarizer film 32 has an optical absorption axis in the direction of arrow c which is also parallel within the limits of error of plus and minus 20 degrees with the direction of the Z'-axis determined by the second orientation film 26. The liquid crystal cell having the polarizer films 30 and 32 thus arranged have the mutually parallel optical absorption axes and is invariably operable as a negatively active liquid crystal cell and constitutes a positively active liquid crystal cell with addition of the phase-shift film 36.

The phase-shift film 36 provided between the second glass substrate 22 and the second polarizer film 32 has its Z'-axis directed to bisect, within the limits of error of plus and minus 10 degrees, the angle defined between the direction of optical absorption of the first polarizer film 30 and the directions in which the micro-grooves in the first orientation film 26 extend. In the relationship among the directions shown in FIG. 7, the direction indicated by arrow m represents only the directions in which the micro-grooves in the first orientation film 24 are oriented. The direction indicated by arrow o represents the directions in which the micro-grooves in the second orientation film 26 are oriented, the direction of optical absorption of the first polarizer film 30, and the direction of optical absorption of the second polarizer film 32. The direction indicated by arrow n represents the direction of the Z'-axis of the phase-shift film 36 and bisects the angle defined between the directions of arrows m and o within the limits of error of plus and minus 10 degrees.

Figure 22:
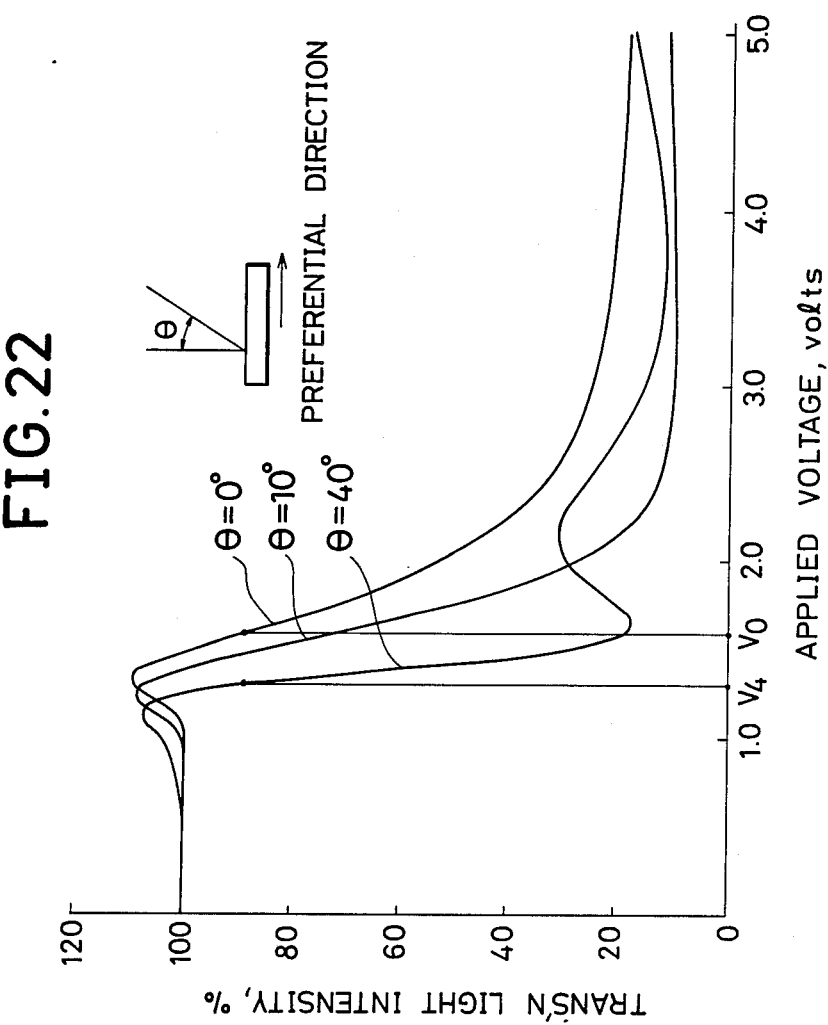
FIG. 22 is a graph showing I–V curves for the fifth preferred embodiment of the present invention with the view angles selected at predetermined degrees.

The view angle dependency of the liquid crystal cell thus constructed in accordance with the present invention will now be evaluated with reference to FIG. 22 which shows the I-V curves for the liquid crystal cell with the view angles selected at 0 degrees, 10 degrees and 40 degrees. The voltages $V_0$ and $V_4$ are in this instance assumed to be selected at 1.58 volt and 1.30 volt, respectively, and thus provide the parameter $\beta$ of 0.28 volt. This means that there is a difference of 0.07 volt between the values $\beta$ in the described prior-art cell and the embodiment under consideration. This difference of the parameter $\beta$ contributes to improvement in the view angle dependency of the fifth preferred embodiment of the present invention and has also resulted from the addition of one or both of the first and second phase-shift films 36 and 38 to the described prior-art cell.

Figure 23:
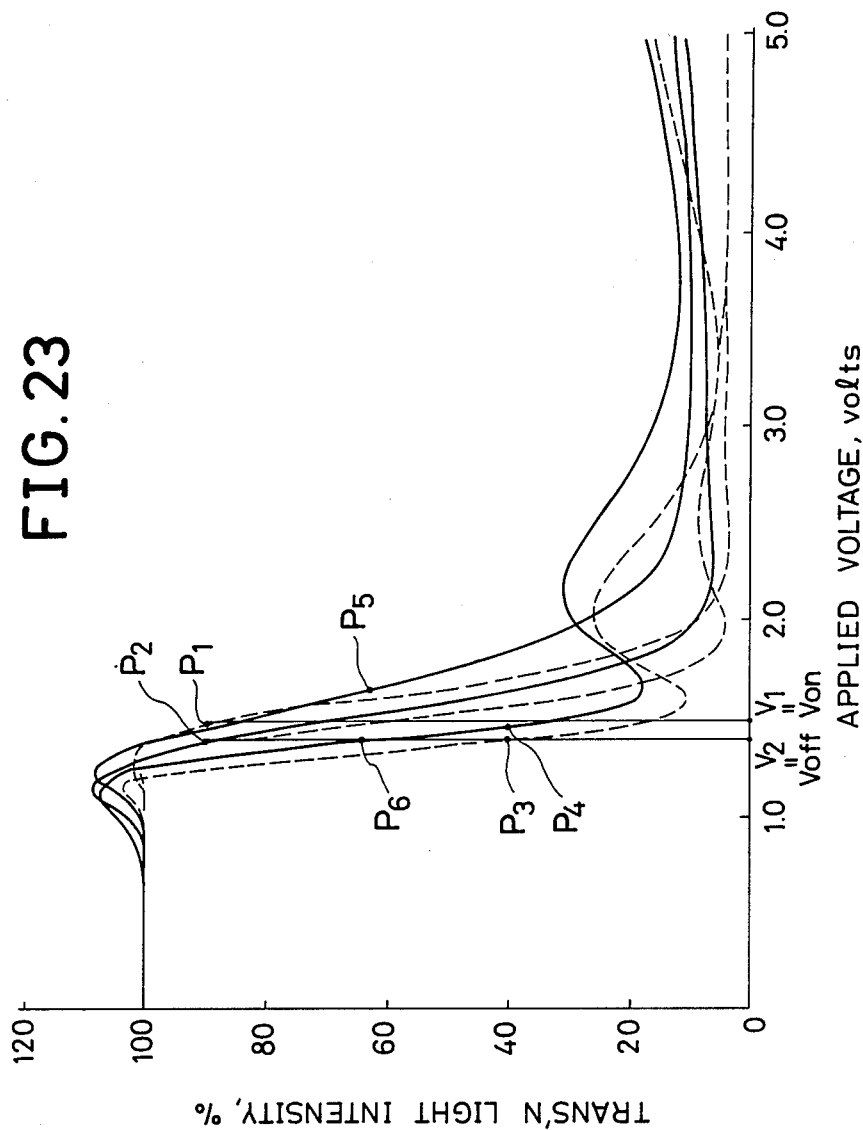
FIG. 23 is a graph showing I–V curves similar to those shown in FIG. 4 and I–V curves similar to those shown in FIG. 21 for comparison between the view-angle characteristics of the prior-art liquid crystal cell and those of the third preferred embodiment of the present invention.

In FIG. 23 of the drawings, I-V curves indicated by full lines are similar to those shown in FIG. 22 and the I-V curves indicated by broken lines are similar to those shown in Fig. 4. Thus, FIG. 23 shows differences between the view-angle characteristics of the described prior-art cell and those of the fifth preferred embodiment of the present invention. The voltages $V_{on}$ and $V_{off}$ used for the cells are assumed to be equal to the voltages $V_1$ and $V_2$ selected for the described prior-art cell. The transmission light intensity percentage achieved by the turned-off segment at the view angle $\theta$ of 40 degrees in the described prior-art cell is 40 per cent as indicated at point $P_3$ in FIG. 17. The voltage to be applied to achieve the same transmission light intensity percentage in the fifth preferred embodiment of the present invention is however 1.46 volt as indicated at point $P_4$ and is thus about 0.08 volt higher than in the described prior-art cell due to the reduction in the parameter $\beta$.

Considering that The ratio $V_{on}/V_{off}$ in the described prior-art cell is given as $V_1/V_2 = 1.07$ as previously noted, then the voltage $V_{on}$ is calculated as $1.07 \times 1.46 = 1.56$ volt when the voltage providing the transmission light intensity percentage at the view angle $\theta$ of 40 degrees is defined by the voltage $V_{off}$. The voltage providing the transmission light intensity percentage with this voltage 1.56 applied at the view angle $\theta$ of 10 degrees is given as 63 per cent as indicated at point $P_5$ in FIG. 23. This also means that, if the voltage $V_{off}$ is selected at the value providing the transmission light intensity percentage of 40 per cent at the view angle $\theta$ of 40 degrees and then the view angle $\theta$ is shifted from 40 degrees to 10 degrees, the transmission light intensity percentage achieved by the turned-on segment in the embodiment of the present invention decreases to 63 per cent as indicated at point $P_5$. The changeover of the transmission light intensity percentage from 90 per cent to 63 per cent at the view angle $\theta$ of 10 degrees as above discussed directly means an increase in the contrast of the display viewed by a person positioned in front of the display screen and accordingly a shift of the view angle toward the direction normal to the screen. In the fifth preferred embodiment of the present invention, the transmission light intensity percentage is increased to 65 per cent as indicated at point $P_6$ in FIG. 9. This again means that the view angle $\theta$ providing the transmission light intensity percentage of 40 per cent in response to application of the voltage $V_{off}$ is larger than 40 degrees and accordingly that the range of optimum view angles is expanded toward higher view angle values also in the fifth preferred embodiment of the present invention.

Sixth Preferred Embodiment

Figure 24:
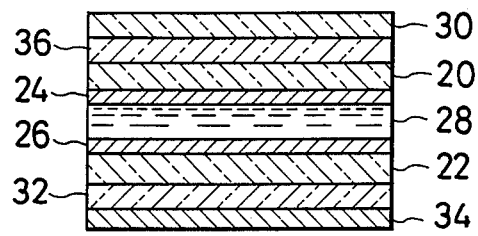
FIG. 24 is a cross sectional view of a liquid crystal cell essentially similar in construction to the liquid crystal cell shown in FIG. 20 but forming a sixth preferred embodiment of the present invention.
Figure 25:
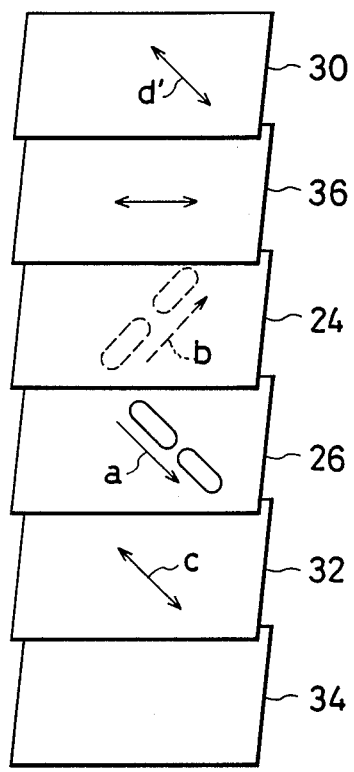
FIG. 25 is a schematic disassembled view of the liquid crystal cell shown in FIG. 24.

FIGS. 24 and 25 of the drawings show a sixth preferred embodiment of the present invention. The embodiment herein shown is basically similar in construction to the fifth preferred embodiment described with reference to FIGS. 20 and 21. In the embodiment herein shown, the sole phase-shift film 36 is provided between the first glass substrate 20 and the first polarizer film 30 with the second polarizer film 32 attached directly to the inner face of the second glass substrate 22 as shown. The optical absorption axes of the polarizer films 30 and 32 and the Z'-axis of the phase-shift film 36 are identical to their respective counterparts in the liquid crystal cell illustrated in FIGS. 20 and 21. The embodiment illustrated in FIGS. 24 and 25 are thus similar in effect to the embodiment described with reference to FIGS. 20 and 21 and thus provide I-V curves similar to those shown in FIGS. 22 and 23.

As will have been understood from the foregoing description, a multidivisional, large-sized display device proposed by the present invention provides is satisfactory in both of the view angle and contrast characteristics and provides the optimum contrast in the directions normal to the display screen. Such an improved liquid crystal cell can be driven by any of the existing drive systems and can be fabricated at a relatively low cost and, for these reasons, a display device using the liquid crystal cell is useful as the display means for an electronic office system.

It has been assumed that the liquid crystal cell in each of the preferred embodiments of the present invention has its first and second polarizer films 30 and 32 arranged to have the mutually parallel optical absorption axes is used as a positively active liquid crystal cell with addition of one or two phase-shift films. This however is solely for purposes of description and, thus, the liquid crystal cell of a display device according to the present invention may have its polarizer films 30 and 32 arranged to have the mutually perpendicular optical absorption axes and may be used as a negatively active liquid crystal cell with addition of one or two phase-shift films.

What is claimed is:

1. A monochromic display device for modulating in intensity an incident light passing therethrough, which comprises:
   (A) a liquid crystal panel including,
      (a) first and second transparent substrates spaced apart substantially in parallel from each other to form a gap therebetween,
      (b) a liquid crystal body filling the gap between said substrates, and
      (c) orientation means urging the molecules of said liquid crystal body to orient in a first direction in the vicinity of the inner face of said first substrate and in a second direction in the vicinity of the inner face of the second substrate, the first direction being substantially perpendicular to said second direction;
   (B) a pair of first and second polarizer films one overlying said first substrate and the other underlying of said second substrate; and
   (C) a pair of phase-shift films each having two vibrational directions consisting of a direction of axis (X') which travel with the larger one of two different refractive indices and direction (Z') which travels with the smaller one of the two different refractive indices, said phase-shift films being so disposed between one of said first and second substrates and one of said polarizer films facing said one of the first and second substrates that said phase-shift films function to invert an incident linearly polarized light into an elliptically polarized light and then to invert the elliptically polarized light into a linearly polarized light.

2. A display device as set forth in claim 1, in which said polarizer films have respective optical absorption axes which are substantially parallel with each other across said substrates.

3. A display device as set forth in claim 2, in which each of said phase-shift films has an optical axis of elasticity in a direction angled at approximately 45 degrees to each of said first and second directions in which the liquid crystal molecules in said gap are oriented by said orientation means.

4. A display device as set forth in claim 2, in which the optical absorption axes of said polarizer films are substantially parallel with one of said first and second directions in which the liquid crystal molecules in said gap are oriented by said orientation means.

5. A display device as set forth in claim 4, in which one of said phase-shift films intervenes between said first substrate and said first polarizer film and the other phase-shift film intervenes between said second substrate and said second polarizer film.

6. A display device as set forth in claim 4, in which said phase-shift films consist of first and second phase-shift films, the first phase-shift film intervening between said first substrate and said first polarizer film and being attached to the outer face of said first substrate and said second phase-shift film having its inner face attached to the outer face of said first phase-shift film and its outer face attached to said first polarizer film.

7. A display device as set forth in claim 4, in which said phase-shift films consists of first and second phase-shift films, the first phase-shift film intervening between said second substrate and said second polarizer film and being attached to the outer face of said second substrate, and the other phase-shift film having its inner face attached to the outer face of said one phase-shift film and its outer face attached to said second polarizer film.

8. A display device as set forth in claim 4, in which each of said phase-shift films has an optical axis of elasticity in a direction angled at approximately 45 degrees to each of said first and second directions in which the liquid crystal molecules in said gap are oriented by said orientation means.

9. A monochromic display device for modulating in intensity an incident light passing therethrough, which comprises:
   (A) a liquid crystal panel including,
      (a) first and second transparent substrates spaced apart substantially in parallel from each other to form a gap therebetween.
      (b) a liquid crystal body filling the gap between said substrates, and
      (c) orientation means urging the molecules of said liquid crystal body to orient in a first direction in the vicinity of the inner face of said first substrate and in a second direction i the vicinity of the inner face of the second substrate, the first direction being substantially perpendicular to said second direction;
   (B) a pair of first and second polarizer films one overlying said first substrate and the other underlying said second substrate, said polarizer films having respective optical absorption axes which are substantially parallel with each other across said substrates, the optical absorption axes of said polarizer films are substantially parallel with one on said first and second directions in which the liquid crystal molecules in said gap are oriented by said orientation means; and (C) a pair of phase-shift films each having two vibrational directions consisting of a direction of axis (X') which travel with the larger one of two different refractive indices and a direction (Z') which travels with the smaller one of the two different refractive indices, one of said phase-shift films being disposed between said first substrate and said first polarizer film and the other phase-shift film being disposed between said second substrate and said second polarizer film that said phase-shift films function to invert an incident linearly polarized light into an elliptically polarized light and then to invert the elliptically polarized light into a linearly polarized light, in which said first phase-shift film has an optical elasticity axis in a direction angled at 35 degrees to 45 degrees to said first direction in which the liquid crystal molecules in said gap are oriented by said orientation means and said second phase-shift film has an optical elasticity axis in a direction angled at −10 degrees to 0 degrees to said second direction in which the liquid crystal molecules in said gap are oriented by said orientation means.

10. A monochromic display device for modulating in intensity an incident light passing therethrough, which comprises:

(A) a liquid crystal panel including,
  (a) first and second transparent substrates spaced apart substantially in parallel from each other to form a gap therebetween,
  (b) a liquid crystal body filling the gap between said substrates, and
  (c) orientation means urging the molecules of said liquid crystal body to orient in a first direction in the vicinity of the inner face of said first substrate and in a second direction in the vicinity of the inner face of the second substrate, the first direction being substantially perpendicular to said second direction;
(b) a pair of first and second polarizer films one overlying said first substrate and the other underlying said second substrate, said polarizer films having respective optical absorption axes which are substantially parallel with each other across said substrates, the optical absorption axes of said polarizer films are substantially parallel with one on said first and second directions in which the liquid crystal molecules in said gap are oriented by said orientation means; and
(C) a pair of phase-shift films each having two vibrational directions consisting of a direction of axis (X') which travel with the larger one of two different refractive indices and a direction (Z') which travels with the smaller one of the two different refractive indices, one of said phase-shift films being disposed between said first substrate and said first polarizer film and the other phase-shift film being disposed between said second substrate and said second polarizer film that said phase-shift films function to invert an incident linearly polarized light into an elliptically polarized light and then to invert the elliptically polarized light into a linearly polarized light, in which said first phase-shift film has an optical elasticity axis in a direction angled at 45 degrees to said first direction in which the liquid crystal molecules in said gap are oriented by said orientation means and said second phase-shift film has an optical elasticity axis in a direction substantially parallel with said second direction in which the liquid crystal molecules in said gap are oriented by said orientation means.

11. A monochromic display device for modulating in intensity an incident light passing therethrough, which comprises:

(A) a liquid crystal panel including,
  (a) first and second transparent substrates spaced apart substantially in parallel from each other to form a gap therebetween,
  (b) a liquid crystal body filling the gap between said substrates, and
  (c) orientation means urging the molecules of said liquid crystal body to orient in a first direction in the vicinity of the inner face of said first substrate and in a second direction in the vicinity of the inner face of the second substrate, the first direction being substantially perpendicular to said second direction;
(B) a pair of first and second polarizer films one overlying said first substrate and the other underlying said second substrate, said polarizer films having respective optical absorption axes which are substantially parallel with each other across said substrates, the optical absorption axes of said polarizer films are substantially parallel with one on said first and second directions in which the liquid crystal molecules in said gap are oriented by said orientation means; and
(C) a pair of phase-shift films each having two vibrational directions consisting of a direction of axis (X,) which travel with the larger one of two different refractive indices and a direction (Z') which travels with the smaller one of the two different refractive indices, one of said phase-shift films being disposed between said first substrate and said first polarizer film and being attached to the outer face of said first substrate and the other phase-shift film having its inner face attached to the outer face of said first phase-shift film and its outer face attached to said first polarizer film that said phase-shift films function to invert an incident linearly polarized light into an elliptically polarized light and then to invert the elliptically polarized light into a linearly polarized light, in which said first phase-shift film has an optical elasticity axis in a direction angled at approximately 45 degrees to each of said first and second directions in which the liquid crystal molecules in said gap are oriented by said orientation means and said second phase-shift film has an optical elasticity axis in a direction substantially perpendicular to one of said first and second directions in which the liquid crystal molecules in said gap are oriented by said orientation means.

12. A display device as set forth in claim 4, in which said second phase-shift film has an optical axis of elasticity in a direction substantially perpendicular to said second direction in which the liquid crystal molecules in said gap are oriented by said orientation means.

13. A display device as set forth in claim 11, in which said second phase-shift film has an optical axis of elasticity in a direction substantially perpendicular to said first direction in which the liquid crystal molecules in said graph are oriented by said orientation means.

14. A monochromic display device for modulating in intensity an incident light passing therethrough, which comprises:

(A) a liquid crystal panel including,
  (a) first and second transparent substrates spaced apart substantially in parallel from each other to form a gap therebetween,
  (b) a liquid crystal body filling the gap between said substrate; and
  (c) orientation means urging the molecules of said liquid crystal body to orient in a first direction in the vicinity of the inner face of said first substrate and in a second direction in the vicinity of the inner face of the second substrate, the first direction being substantially perpendicular to said second direction;
(B) a pair of first and second polarizer films one overlying said first substrate and the other underlying said second substrate, said polarizer films having respective optical absorption axes which are substantially parallel with each other across said substrates, the optical absorption axes of said polarizer films are substantially parallel with one on said first and second directions in which the liquid crystal molecules in said graph are oriented by said orientation means; and
(C) a pair of phase-shift films each having two vibrational directions consisting of a direction of axis (X') which travel with the larger one of two different refractive indices and a direction (Z') which travels with the smaller one of the two different refractive indices, one of said phase-shift films being disposed between said second substrate and said second polarizer film and being attached to the outer face of said second substrate, and the other phase-shift film having its inner face attached to the outer face of said one phase-shift film and its outer face attached to said second polarizer film that said phase-shift films function to invert an incident linearly polarized light into an elliptically polarized light and then to invert the elliptically polarized light into a linearly polarized light, in which said first phase-shift film has an optical elasticity axis in a direction angled at approximately 45 degrees to each of said first and second directions in which the liquid crystal molecules in said gap are oriented by said orientation means and said second phase-shift film has an optical elasticity axis in a direction substantially perpendicular to one of said first and second directions in which the liquid crystal molecules in said gap are oriented by said orientation means.

* * * * *